United States Patent
Nagano et al.

(10) Patent No.: US 8,213,496 B2
(45) Date of Patent: Jul. 3, 2012

(54) IMAGE PROCESSING DEVICE, IMAGE PROCESSING METHOD, AND IMAGE PROCESSING PROGRAM

(75) Inventors: Takahiro Nagano, Minato-ku (JP); Tetsujiro Kondo, Minato-ku (JP); Tsutomu Watanabe, Minato-ku (JP); Junichi Ishibashi, Minato-ku (JP); Hisakazu Shiraki, Minato-ku (JP); Naoki Fujiwara, Minato-ku (JP); Masanori Kanemaru, Minato-ku (JP); Shinichiro Kaneko, Minato-ku (JP); Yasuhiro Suto, Minato-ku (JP)

(73) Assignee: Sony Corporation, Tokyo (JP)

( * ) Notice: Subject to any disclaimer, the term of this patent is extended or adjusted under 35 U.S.C. 154(b) by 1412 days.

(21) Appl. No.: 11/722,460

(22) PCT Filed: Dec. 21, 2005

(86) PCT No.: PCT/JP2005/023988
§ 371 (c)(1),
(2), (4) Date: Jun. 21, 2007

(87) PCT Pub. No.: WO2006/068282
PCT Pub. Date: Jun. 29, 2006

(65) Prior Publication Data
US 2008/0129873 A1 Jun. 5, 2008

(30) Foreign Application Priority Data

Dec. 21, 2004 (JP) ................................. 2004-369267

(51) Int. Cl.
*H04N 7/26* (2006.01)
*G06K 9/00* (2006.01)
*G06K 9/62* (2006.01)
*H04N 5/14* (2006.01)

(52) U.S. Cl. ........ 375/240; 382/189; 382/209; 348/335; 348/581; 348/715; 348/699; 348/E5.066; 348/E5.077

(58) Field of Classification Search ................... 375/240
See application file for complete search history.

(56) References Cited

U.S. PATENT DOCUMENTS
4,833,535 A * 5/1989 Ozeki et al. ................ 348/400.1
(Continued)

FOREIGN PATENT DOCUMENTS
EP 1 361 542 A1 11/2003
(Continued)

OTHER PUBLICATIONS

Grünschloβ, L., 'Motion Blur', Faculty of Engineering and Computer Sciences, Ulm University, Germany, Apr. 3, 2008, entire document, http://gruenschloss.org/motion-blur/motion-blur.pdf.*

(Continued)

*Primary Examiner* — Christian Laforgia
*Assistant Examiner* — Ronald Baum
(74) *Attorney, Agent, or Firm* — Oblon, Spivak, McClelland, Maier & Neustadt, L.L.P.

(57) ABSTRACT

A motion-vector-setting section (31) sets a motion vector in units of pixel in a target image. Based on the motion vector, a target-pixel-setting section (35) sets a target pixel for each image in plural images to be processed. A motion-blur-amount-setting section (33) sets a motion blur amount in units of pixel based on the motion vector and the exposure-time ratio set in units of image in the exposure-time-ratio-setting section (32). A processing-region-setting section (36) sets processing regions corresponding to the target pixel for each of the plural images based on the motion blur amount. A processing-coefficient-setting section (37) sets processing coefficients based on the motion blur amount. A pixel-value-generating section (38) generates motion-blur-removed pixel values that correspond to the target pixel by linear combination of pixel values corresponding to pixels in the processing region and the processing coefficients, so that they can be output from an integration section (39) as one pixel value. By utilizing any time-directional information significantly, motion-blur-removing processing can be accurately performed.

7 Claims, 23 Drawing Sheets

U.S. PATENT DOCUMENTS

| | | | |
|---|---|---|---|
| 5,557,684 A * | 9/1996 | Wang et al. | 382/107 |
| 5,878,169 A * | 3/1999 | Miyamoto | 382/236 |
| 6,965,645 B2 * | 11/2005 | Zhang et al. | 375/240.16 |
| 7,406,123 B2 * | 7/2008 | Peker et al. | 375/240.16 |
| 7,536,035 B2 * | 5/2009 | Kikuchi | 382/107 |
| 7,580,620 B2 * | 8/2009 | Raskar et al. | 396/55 |
| 2004/0066460 A1 | 4/2004 | Kondo et al. | |

FOREIGN PATENT DOCUMENTS

| | | |
|---|---|---|
| JP | 2001 250119 | 9/2001 |
| JP | 2002 373336 | 12/2002 |
| JP | 2003 233817 | 8/2003 |

OTHER PUBLICATIONS

U.S. Appl. No. 11/793,701, filed Jun. 21, 2007, Nagano, et al.

U.S. Appl. No. 11/722,436, filed Jun. 21, 2007, Nagano, et al.

* cited by examiner

FIG. 10

| DETERMINATION OF REGION | STILL-OR-MOTION DETERMINATION OF (t-2) FRAME AND (t-1) FRAME | STILL-OR-MOTION DETERMINATION OF (t-1) FRAME AND (t) FRAME | STILL-OR-MOTION DETERMINATION OF (t) FRAME AND (t+1) FRAME | STILL-OR-MOTION DETERMINATION OF (t+1) FRAME AND (t+2) FRAME | DETERMINATION METHOD |
|---|---|---|---|---|---|
| BACKGROUND REGION | | STILL | STILL | | OR |
| MIXED REGION (COVERED BACKGROUND REGION) | STILL | MOTION | | | AND |
| MIXED REGION (UNCOVERED BACKGROUND REGION) | | | MOTION | STILL | AND |
| FOREGROUND REGION | | MOTION | MOTION | | AND |

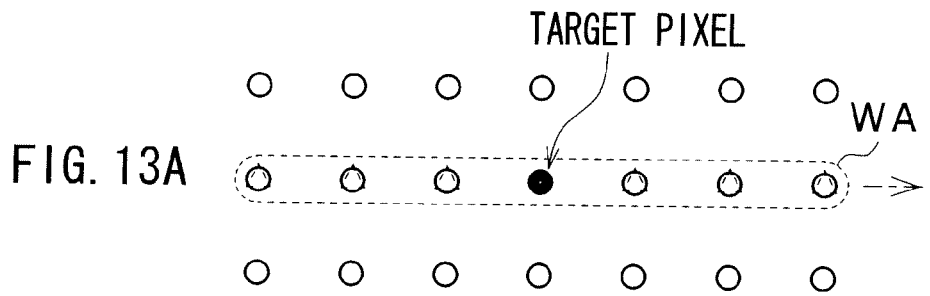
FIG. 13A
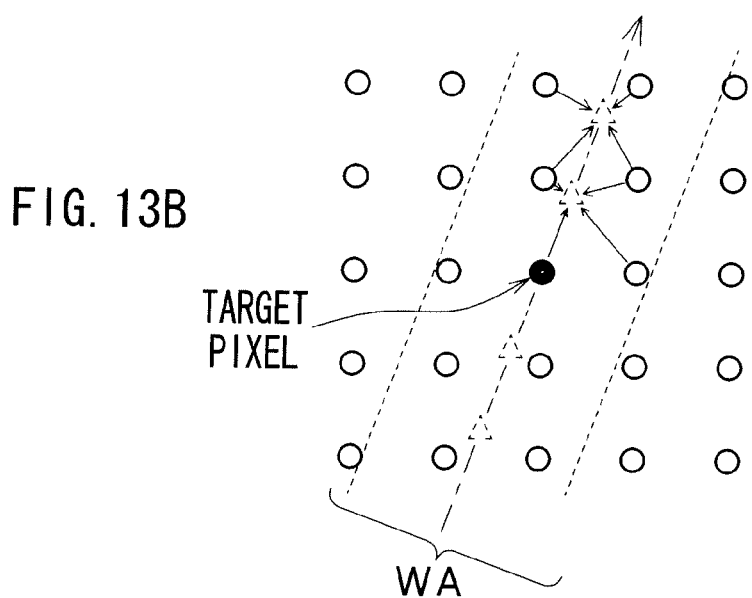
FIG. 13B
FIG. 14
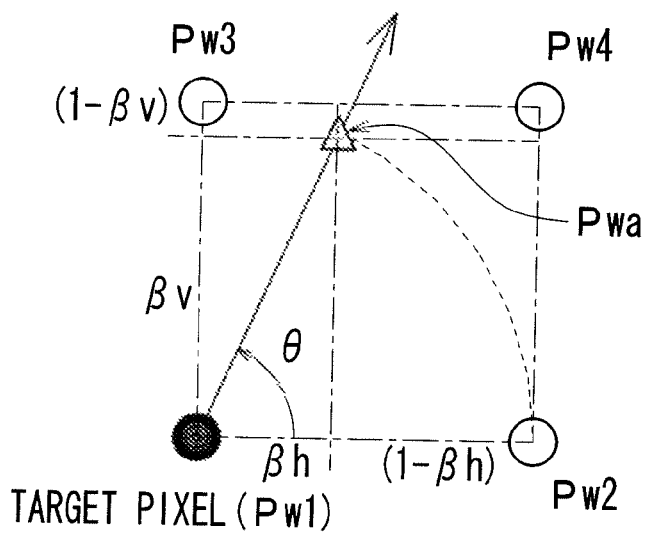

IMAGE PROCESSING DEVICE, IMAGE PROCESSING METHOD, AND IMAGE PROCESSING PROGRAM

TECHNICAL FIELD

The present invention relates to an image-processing apparatus, an image-processing method, and an image-processing program. More specifically, it sets a motion vector in units of pixel in a target image and sets a target pixel for each image in plural images to be processed based on this motion vector. It also sets a motion blur amount in units of pixel based on the motion vector and an exposure time ratio set in units of image, sets processing coefficients and processing regions corresponding to the target pixel based on this motion blur amount, and performs linear combination of the pixel values corresponding to the pixels in the processing region and the processing coefficients to generate a motion-blur-removed pixel value that corresponds to the target pixel.

BACKGROUND ART

Conventionally, an event in a real world has been converted into data by using a sensor. The data acquired by using the sensor is information that is obtained by projecting information of the real world (e.g., light) onto a space and time having a lower number of dimensions than the real world. Accordingly, the information obtained by projection has distortion that occurs through projection. For example, in the case of imaging, by using a video camera, a moving object in front of a background at rest and converting it into data as an image signal, information of the real world is sampled and converted into data, so that an image which is displayed on the basis of the image signal encounters a motion blur that the moving object blurs as distortion that occurs through projection.

To solve this problem, as disclosed in Japanese Patent Application Publication No. 2001-250119 (Corresponding U.S. patent application Ser. No. 09/830,858, Corresponding EP Patent Application Publication No. EP1164545), for example, by detecting a profile of an image object that corresponds to an object in a foreground contained in an input image, the image object that corresponds to the object in the foreground is coarsely extracted to detect a motion vector of the image object corresponding to the object in the foreground that is coarsely extracted, so that the detected motion vector and its position information may be used to mitigate a motion blur.

DISCLOSURE OF THE INVENTION

In such the conventional motion-blur-removing processing, however, any blur has been removed by performing any space processing corresponding to blur amount on a portion of the input image, in which motion blur(s) occur(s). Spatially completed processing similar to it, however, is also performed on motion image, so that resolution after the processing has been performed may be insufficient. Further, in the case of using also time-directional information to perform processing, a period of exposure time in the actual image is determined in a camera side with reference to a shutter speed, so that a motion amount of an object and a blur amount of an input image do not always agree. Accordingly, if only the blur amount or the motion direction of the input image is easily used, it is impossible to utilize the time-directional information significantly to perform the processing.

An image-processing apparatus according to the invention comprises a motion-vector-setting section that sets a motion vector in units of pixel in a target image, a target-pixel-setting section that sets a target pixel for each image in plural images to be processed based on the motion vector set in the motion-vector-setting section, an exposure-time-ratio-setting section that sets in units of image an exposure time ratio that is a ratio between a time interval of the target image and a period of exposure time, a motion-blur-amount-setting section that sets a motion blur amount for each pixel based on the motion vector set for each pixel in the motion-vector-setting section and the exposure time ratio set in the exposure-time-ratio-setting section, a processing-region-setting section that sets a processing region corresponding to the target pixel set for each image in the target-pixel-setting section based on the motion blur amount set in the motion-blur-amount-setting section and a motion direction corresponding to the motion vector, a processing-coefficient-setting section that sets a specific processing coefficient based on the motion blur amount of the target pixel set in the motion-blur-amount-setting section or sets a processing coefficient that corresponds to the motion blur amount and the motion direction of the target pixel, and a pixel-value-generating section that generates a pixel value that corresponds to the target pixel by linear combination of a new pixel value for processing generated corresponding to the motion direction from the pixel value corresponding to the pixel in the processing region set for each image and the specific processing coefficient set in the processing-coefficient-setting section or by linear combination of the pixel value corresponding to the pixel in the processing region and the processing coefficient set corresponding to the motion blur amount and the motion direction of the target pixel.

An image-processing method according to the invention comprises a motion-vector-setting step of setting a motion vector in units of pixel in a target image, a target-pixel-setting step of setting a target pixel for each image in plural images to be processed based on the motion vector set in the motion-vector-setting step, an exposure-time-ratio-setting step of setting in units of image an exposure time ratio that is a ratio between a time interval of the target image and a period of exposure time, a motion-blur-amount-setting step of setting a motion blur amount for each pixel based on the motion vector set in units of pixel in the motion-vector-setting step and the exposure time ratio set in the exposure-time-ratio-setting step, a processing-region-setting step of setting a processing region corresponding to the target pixel set for each image in the target-pixel-setting step based on the motion blur amount set in the motion-blur-amount-setting step and a motion direction corresponding to the motion vector, a processing-coefficient-setting step of setting a specific processing coefficient based on the motion blur amount of the target pixel set in the motion-blur-amount-setting step or setting a processing coefficient that corresponds to the motion blur amount and the motion direction of the target pixel, and a pixel-value-generating step of generating a pixel value that corresponds to the target pixel by linear combination of a new pixel value for processing generated corresponding to the motion direction from the pixel value corresponding to the pixel in the processing region set for each image and the specific processing coefficient set in the processing-coefficient-setting step or by linear combination of the pixel value corresponding to the pixel in the processing region and the processing coefficient set corresponding to the motion blur amount and the motion direction of the target pixel.

An image-processing program according to the invention allows a computer to perform a motion-vector-setting step of setting a motion vector in units of pixel in a target image, a target-pixel-setting step of setting a target pixel for each image in plural images to be processed based on the motion vector set in the motion-vector-setting step, an exposure-time-ratio-setting step of setting in units of image an exposure time ratio that is a ratio between a time interval of the target image and a period of exposure time, a motion-blur-amount-setting step of setting a motion blur amount in units of pixel based on the motion vector set in units of pixel in the motion-vector-setting step and the exposure time ratio set in the exposure-time-ratio-setting step, a processing-region-setting step of setting a processing region corresponding to the target pixel set for each image in the target-pixel-setting step based on the motion blur amount set in the motion-blur-amount-setting step and a motion direction corresponding to the motion vector, a processing-coefficient-setting step of setting a specific processing coefficient based on the motion blur amount of the target pixel set in the motion-blur-amount-setting step or setting a processing coefficient that corresponds to the motion blur amount and the motion direction of the target pixel, and a pixel-value-generating step of generating a pixel value that corresponds to the target pixel by linear combination of a new pixel value for processing generated corresponding to the motion direction from the pixel value corresponding to the pixel in the processing region set for each image and the specific processing coefficient set in the processing-coefficient-setting step or by linear combination of the pixel value corresponding to the pixel in the processing region and the processing coefficient set corresponding to the motion blur amount and the motion direction of the target pixel.

In the present invention, a motion vector is set in units of pixel in a target image and based on the motion vector, a target pixel is set for each image in plural images to be processed. A motion blur amount is set in units of pixel based on the motion vector and the exposure-time ratio set in units of image. Processing regions are set based on the motion blur amount and a motion direction corresponding to the motion vector, and a pixel value that corresponds to the target pixel is generated by linear combination of new pixel values for processing generated corresponding to the motion direction from the pixel values corresponding to the pixels in the processing region and the set specific processing coefficients or by linear combination of the pixel values corresponding to the pixels in the processing region and the processing coefficients set corresponding to the motion blur amount and the motion direction of the target pixel. Further, motion-blur-removed pixel values corresponding to the target pixel for each image are integrated to output them as one pixel value. Additionally, regarding an image picked-up with no shutter operation, a motion amount of the set motion vector is used as motion blur amount. Further, a motion amount of the motion vector is set in units of sub-pixel.

EFFECTS OF THE INVENTION

According to the present invention, a motion vector is set in units of pixel in a target image and based on the motion vector, a target pixel is set for each image in plural images to be processed. A motion blur amount is set in units of pixel based on the motion vector and the exposure-time ratio set in units of image. Processing regions are set based on the motion blur amount and a motion direction corresponding to the motion vector, and a pixel value that corresponds to the target pixel is generated by linear combination of new pixel values for processing generated corresponding to the motion direction from the pixel values corresponding to the pixels in the processing region and the set specific processing coefficients or by linear combination of the pixel values corresponding to the pixels in the processing region and the processing coefficients set corresponding to the motion blur amount and the motion direction of the target pixel.

It is thus possible to obtain any real world information embedded in the image signal by using not only any space-directional information but also any time-directional information, so that an image having high resolution, in which a motion blur is removed, from a motion blur image that undergoes any distortion by the image sensor can be reproduced.

Further, the processing coefficients can remove a motion blur accurately because the motion amount of motion vector is set in units of sub-pixel. Additionally, since motion-blur-removed pixel values corresponding to the target pixel for each image are integrated so that they can be output as one pixel value, it is possible to obtain, for example, any motion-blur-removed image having a small amount of noises or the like. Further, regarding an image picked-up with no shutter operation, a motion amount of the set motion vector is used as motion blur amount, so that motion-blur-removing processing can be easily performed.

BRIEF DESCRIPTION OF THE DRAWINGS

FIG. 10 is a diagram for explaining region-determining processing;
FIGS. 13A and 13B are diagrams each for showing a processing region;
FIG. 14 is a diagram for explaining a method of calculating a pixel value;
FIG. 18 is an explanatory chart of operations for selecting a prediction tap discretely.

FIG. 27 is a diagram for showing an accumulation model in units of half pixel;

BEST MODE FOR CARRYING OUT THE INVENTION

Figure 1:
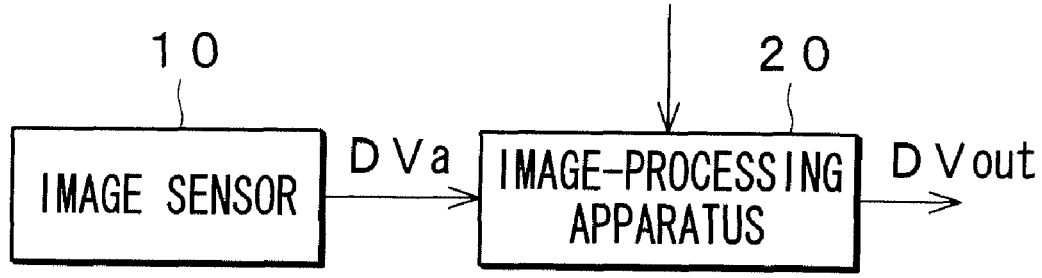
FIG. 1 is a diagram for showing a system configuration.

The following will describe embodiments of the present invention with reference to drawings. FIG. 1 is a block diagram for showing a configuration of a system to which the present invention is applied. An image sensor 10 generates an image signal DVa by picking up an image of a real society to supply it to an image-processing apparatus 20. The image-processing apparatus 20 extracts information embedded in the supplied image signal DVa of an input image to generate an image signal DVout from which the embedded information is extracted and outputs it. It is to be noted that the image-processing apparatus 20 is also configured so that it can extract the information embedded in the image signal DVa by using a variety of pieces of information ET supplied from an outside.

Figure 2:
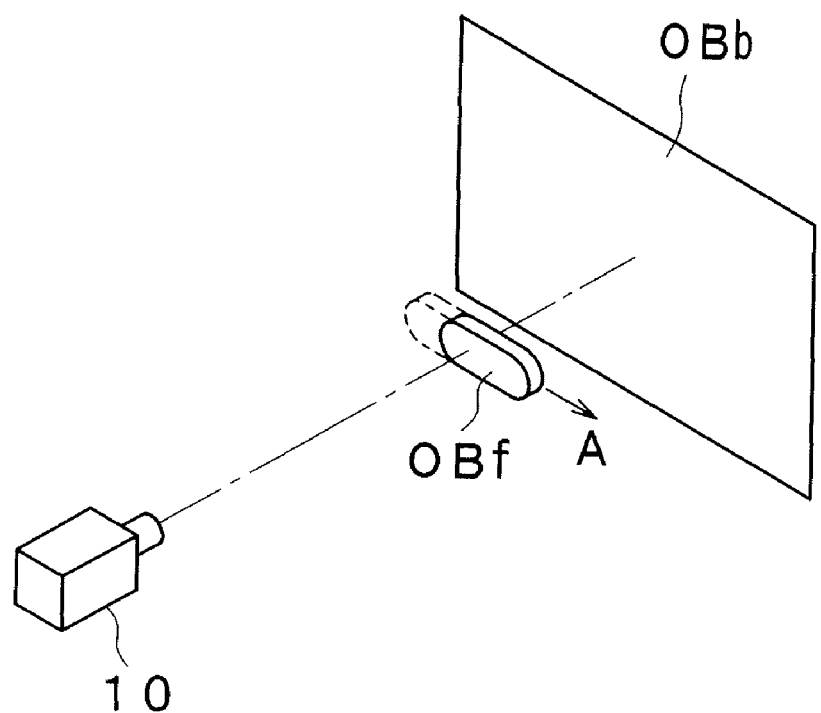
FIG. 2 is an illustration for explaining how an image sensor picks up an image.

The image sensor 10 is constituted of a video camera or the like that is equipped with a charge-coupled device (CCD) area sensor and an MOS area sensor, which are a solid-state image pick-up device, and picks up an image of a real society. For example, as shown in FIG. 2, when a moving object OBf that corresponds to a foreground is moving in a direction of an arrow A between the image sensor 10 and an object OBb that corresponds to a background, the image sensor 10 picks up an image of the moving object OBf that corresponds to the foreground together with an image of the object OBb that corresponds to the background.

A detection element in the image sensor 10 converts an input light into charges during a period of time corresponding to a period of exposure time and accumulates thus photo-electrically converted charges. A quantity of the charges is roughly proportional to an intensity of the input light and a period of time when the light is being input. During the period of time corresponding to the period of exposure time, the detection element adds charges converted from the input light to already accumulated charges. In other words, during the period of time corresponding to the period of exposure time, the detection element integrates the input light and accumulates a quantity of charges that corresponds to the integrated light. The detection element may be also said to have an integration effect on time. By, thus, performing photo-electric conversion by using the image sensor, the input light is converted into charges for each pixel, which are accumulated for each unit of the period of exposure time. A pixel signal is generated in accordance with the quantity of thus accumulated charges and then, by using this pixel signal, an image signal having a desired frame rate is generated, which is supplied to the image-processing apparatus. It is to be noted that the period of exposure time for the image sensor is a period of time when, as described above, the image sensor converts the input light into charges and accumulates them in the detection element, which is equal to an image time interval (e.g., a period of time for one frame) in a case where the shutter is not operated. It is also equal to a period of shutter-open time in a case where the shutter is operated.

Figure 3:
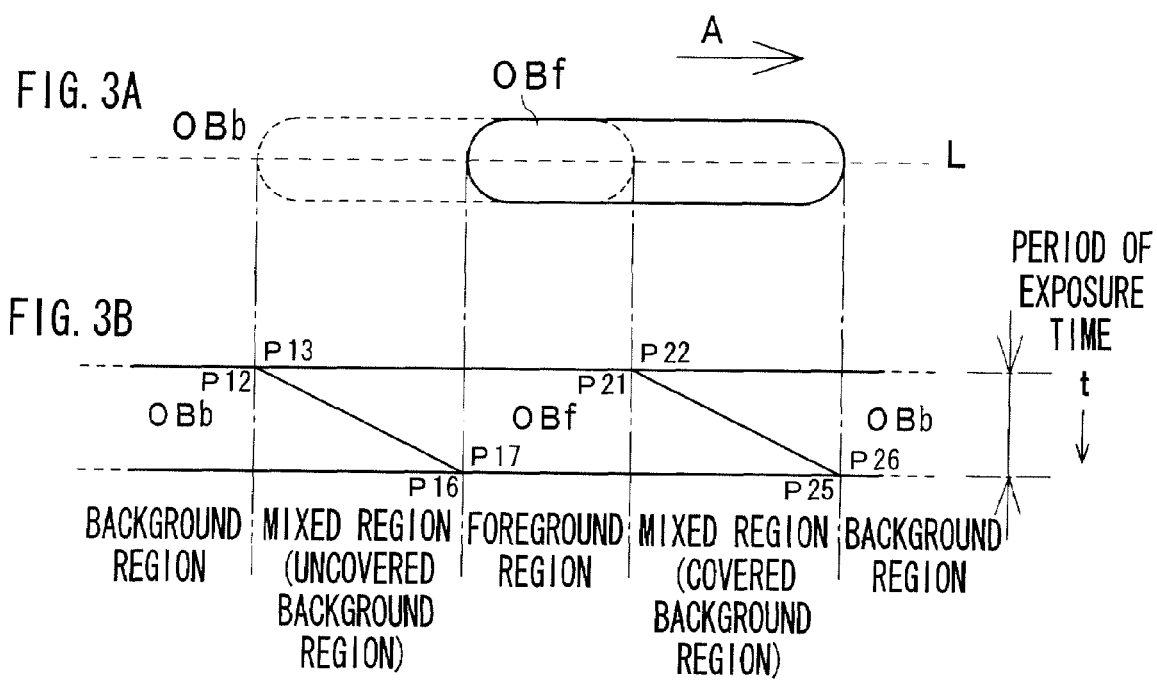
FIGS. 3A and 3B are diagrams each for explaining a picked-up image.

FIGS. 3A and 3B are diagrams each for explaining a picked-up image represented by an image signal. FIG. 3A shows an image obtained by picking up an image of a moving object OBf that corresponds to the moving foreground and an image of an object OBb that corresponds to the still background. It is to be noted that the moving object OBf that corresponds to the foreground is supposed to be moving horizontally in a direction of an arrow A.

FIG. 3B shows a relationship between the image and time at a position on line L, which is indicated by broken lines, extending in the direction of the arrow A as shown in FIG. 3A. If a length of the moving object OBf in its motion direction on the line L is, for example, nine pixels and the moving object OBf moves as much as five pixels in one period of exposure time, its front end and rear end that have stayed at pixel positions P21 and P13 at the beginning of a period of frame period move to pixel positions P25 and P17 at the end of the period of exposure time, respectively. Further, if the shutter is not operated, a period of exposure time for one frame is equal to one period of frame time, so that the front end and the rear end move to pixel positions P26 and P18, respectively, at the beginning of the next period of frame time.

Accordingly, in the period of frame time on the line L, a portion up to pixel position P12 and a portion from pixel position P26 each provide a background region that is constituted of a background component only. A portion between the pixels positions P17 and P21 provides a foreground region constituted of a foreground component only. A portion between the pixel positions P13 and P16 and a portion between the pixel positions P22 and P25 each provide a mixed region in which a foreground component and a background component are mixed. The mixed regions are classified into a covered background region in which a background component is covered by a foreground as time elapses and an uncovered background region in which a background component appears as time elapses. It is to be noted that in FIG. 3B, a mixed region positioned on the front end side of the foreground object OBf in its traveling direction provides a covered background region and a mixed region positioned on its rear end side in its traveling direction provides an uncovered background region. Thus, an image signal contains an image that includes a foreground region, background regions, or a covered background region or an uncovered background region.

Figure 4:
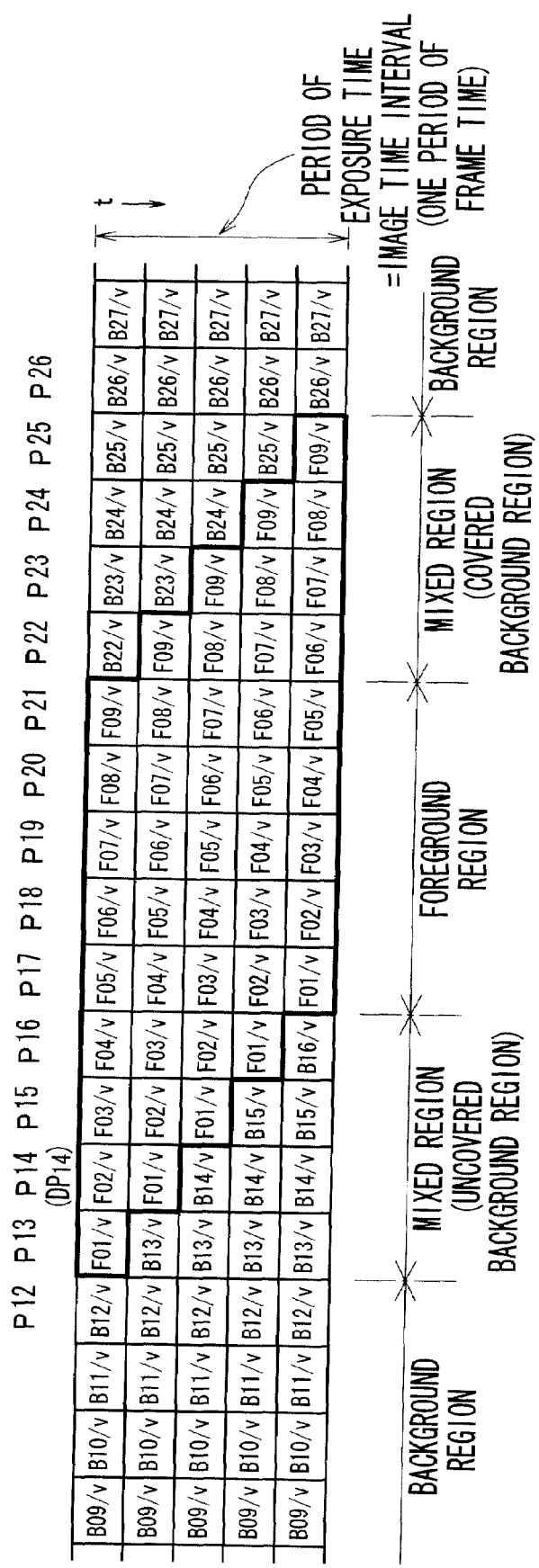
FIG. 4 is an explanatory chart of operations for dividing pixel values in a time direction.

Herein, on the assumption that an image time interval is short and that the moving object OBf that corresponds to the foreground is a rigid body and moves with uniform speed, operations for dividing pixel values on the line L time-directionally are performed as shown in FIG. 4. In these operations for time-directional division, a pixel value is developed in the time direction and divided by a virtual divisor into equal time intervals. It is to be noted that in FIG. 4, a vertical axis represents time, to indicate that time elapses downward in the figure.

The virtual divisor is set to one corresponding to a motion amount v or the like of a moving object in an image time interval. For example, if the motion amount v in one period of frame time corresponds to five pixels as described above, the virtual divisor is set to "5" corresponding to the motion amount v, to divide one period of frame time into five equal time intervals.

Further, pixel values, during one period of frame time, of pixel position Px obtained when the object OBb that corresponds to the background is picked up are supposed to be Bx and pixel values obtained at the pixels when the moving object OBf having a nine-pixel length on the line L, which corresponds to the foreground, is picked up with it being at rest are supposed to be F09 (on the front end side) through F01 (on the rear end side).

In this case, for example, pixel value $DP_{14}$ at pixel position P14 is given by Equation 1:

$$DP_{14}=B14/v+B14/v+B14/v+F01/v+F02/v \quad (1)$$

At this pixel position P14, three virtual time dividends (a period of frame time/v) of the background component and two virtual time dividends of the foreground component are contained and so, a mixture ratio α of the background component with respect to the pixel values is 3/5. Similarly, for example, at pixel position P22, one virtual time dividend of the background component and four virtual time dividends of the foreground component are contained and so, a mixture ratio α therewith is 1/5.

Figure 5:
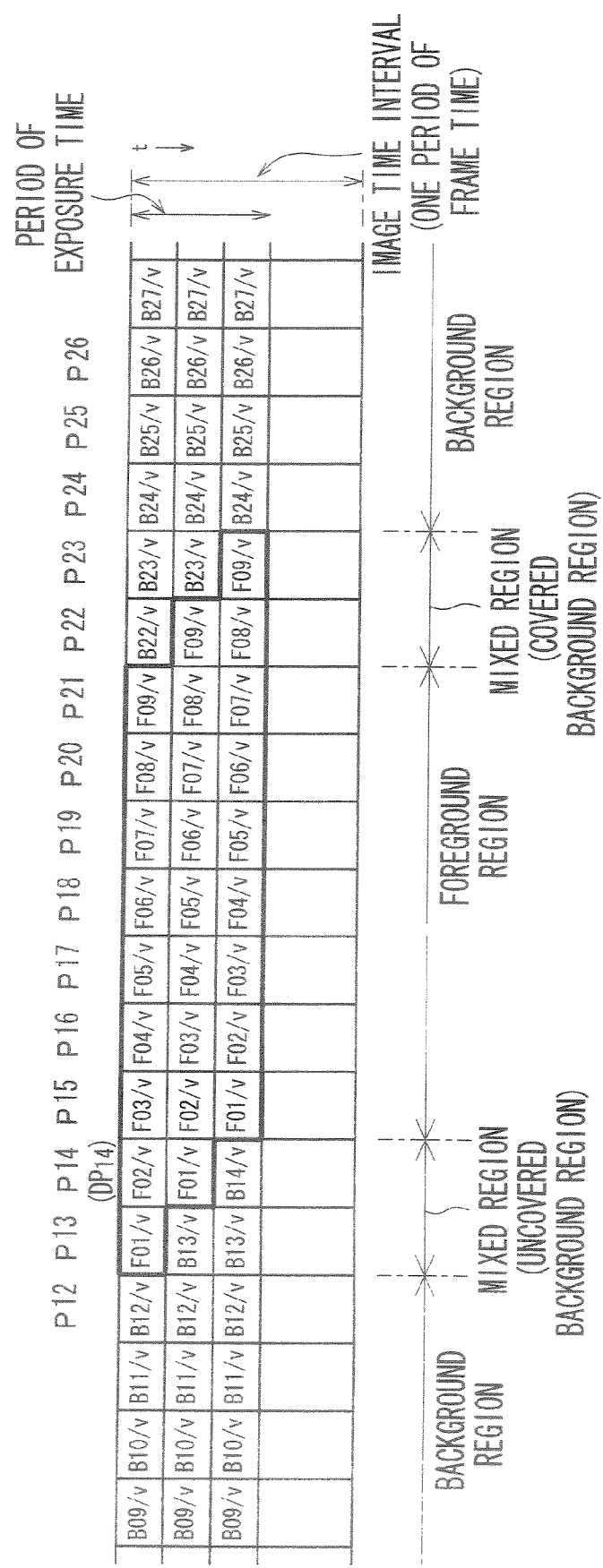
FIG. 5 is an explanatory chart of operations for dividing pixel values in a time direction when a shutter is operated.

Further, if the shutter is operated to change an exposure time ratio indicative of a ratio of a period of exposure time with respect to one period of frame time, for example, if the exposure time ratio is changed to 3/5, as shown in FIG. 5, operations to divide pixel values time-directionally in one period of frame time are performed, so that the pixel values can be divided by a virtual divisor in accordance with the exposure time ratio into equal time intervals.

The virtual divisor is set to one corresponding to a motion amount v or the like of a moving object in a pixel time interval. For example, if the motion amount v in one period of frame time is as long as five pixels as described above, the virtual divisor is set to "5" corresponding to the motion amount v, to divide one period of frame time into five equal time intervals.

In this case, for example, pixel value $DP_{14}$ at pixel position P14 is given by Equation 2:

$$DP_{14}=B14/v+F01/V+F02/v \quad (2)$$

At this pixel position P14, one virtual time dividend (a period of frame time/v) of the background component and two virtual time dividends of the foreground component are contained and so, a mixture ratio α is 1/3. Similarly, for example, at pixel position P22, one virtual time dividend of the background component and two virtual time dividends of the foreground component are contained and so, a mixture ratio α is 1/3.

If the shutter is operated, by multiplying an exposure time ratio and a motion amount v in one period of frame time, the motion amount vs in a period of exposure time can be calculated.

Thus, since foreground components move, different foreground components are added within one period of exposure time, so that a foreground region corresponding to a moving object contains a motion blur. Accordingly, the image-processing apparatus 20 extracts significant information that has been embedded in an image signal, to generate the image signal DVout in which the motion blur of the moving object OBf that corresponds to the foreground is mitigated.

Figure 6:
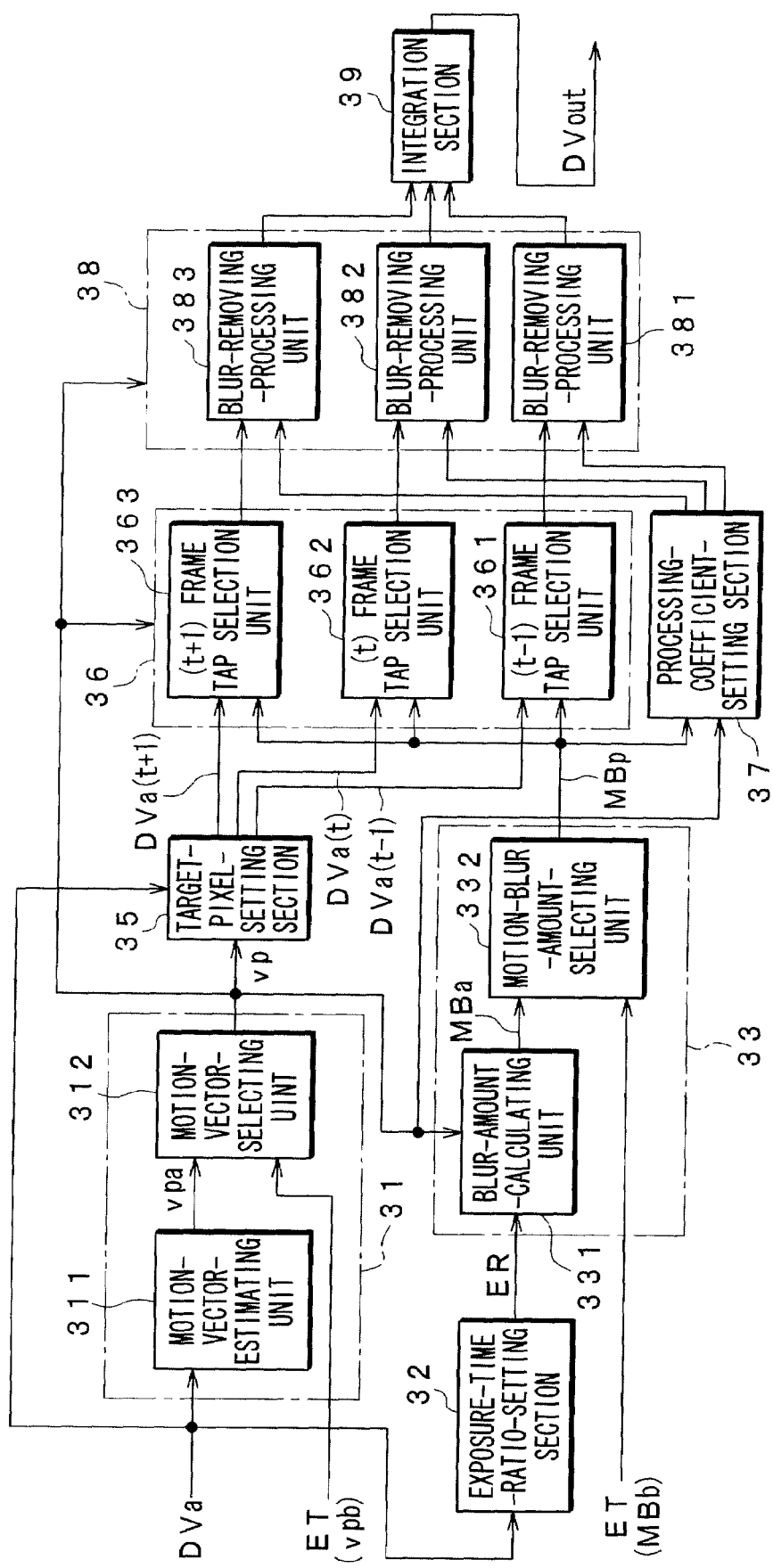
FIG. 6 is a functional block diagram of an image-processing apparatus.

FIG. 6 is a functional block diagram of the image-processing apparatus. It is to be noted that functions of the image-processing apparatus may be realized by hardware or software. In other words, the function blocks of FIG. 6 may be realized by either hardware or software.

Figure 7:
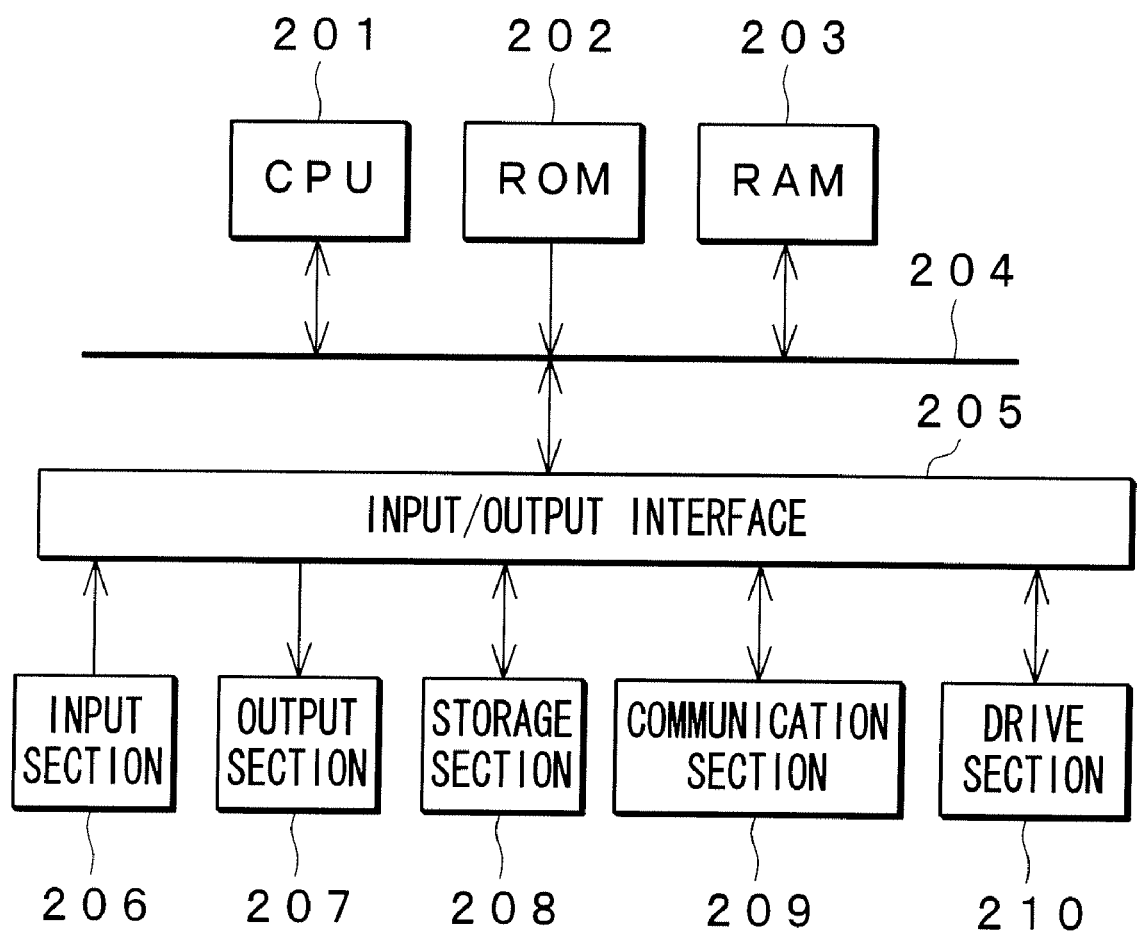
FIG. 7 is a diagram for showing a configuration of the image-processing apparatus in a case where software is used.

A configuration of the image-processing apparatus 20 in use of the software is shown in, for example, FIG. 7. A central processing unit (CPU) 201 performs various kinds of processing in accordance with programs stored in a read only memory (ROM) 202 or a storage section 208, and the programs to realize the functions of the image-processing apparatus are stored in the ROM 202 and the storage section 208. A random access memory (RAM) 203 appropriately stores a program or data which is executed by the CPU 201. The CPU 201, the ROM 202, and the RAM 203 are connected to each other via a bus 204.

To the CPU 201, an input/output interface 205 is further connected via the bus 204. An input section 206 constituted of a keyboard, a mouse, or a microphone and an output section 207 constituted of a display or a speaker are connected to the input/output interface 205. The CPU 201 performs various kinds of processing in accordance with commands input from the input section 206. Then, the CPU 201 provides the output section 207 with an image, an audio, etc. obtained as a result of the processing.

The storage section 208 connected to the input/output interface 205 is constituted of, for example, a hard disk, to store programs and various kinds of data to be run by the CPU 201. A communication section 209 communicates with an external apparatus via the Internet or any other network. In this example, the communication section 209 serves as an acquisition section that takes in an output of the sensor. It may also acquire programs via the communication section 209 and store them in the storage section 208.

A drive section 210 connected to the input/output interface 205, if mounted with a storage medium such as a magnetic disk, an optical disk, a magnetic optical disk, or a semiconductor memory, drives them to acquire program or data stored in the storage medium. The acquired programs and data are transferred to the storage section 208 and stored in it as necessary.

As shown in FIG. 6, an image signal DVa of input image, which is received by the image-processing apparatus 20, is supplied to a motion-vector-estimating unit 311 of a motion-vector-setting section 31, an exposure-time-ratio-setting section 32, and a target-pixel-setting section 35.

The motion-vector-estimating unit 311 estimates a motion vector vpa for each pixel in the target image based on the image signal DVa and supplies a motion-vector-selecting unit 312 with the estimated motion vector vpa. The motion-vector-estimating section 311 can use a method such as a block-matching method or a gradient method to estimate a motion vector for each pixel. Herein, the target image refers to as an image in which motion-blur-removing processing is executed among input images supplied to the image-processing apparatus 20, and the target pixel refers to as a pixel in which the motion-blur-removing processing is executed in the target image.

The image-motion-selecting section 312 can receive the motion vector vpb when this on vector vpb is supplied from outside as information ET and selects any one from the motion vector vpa supplied from the motion-vector-estimating unit 311 and the motion vector vpb supplied from the outside to supply a blur-amount-setting section 33 and the target-pixel-setting section 35 with it as a motion vector vp. Further, it supplies the motion vector vp to a processing-region-setting section 36, a processing-coefficient-setting section 37, a pixel-value-generating section 38 based on processing coefficients to be stored in the processing-coefficient-setting section 37, which will be described later. Selection of motion vector is made by, for example, a user and if a motion-blur-removing processing is performed by using a motion vector detected from the target image, it selects the motion vector vpa supplied from the motion-vector-estimating unit 311. Alternatively, it selects the received motion vector vpb if a motion vector to be used in the motion-blur-removing processing is set.

The exposure-time-ratio-setting section 32 sets an exposure time ratio ER indicative of a ratio of a period of exposure time with respect to an image interval in a target image for each image. This exposure time ratio ER can be set by using, for example, a technology disclosed in Japanese Patent Application Publication No. 2003-6648.

Figure 8:
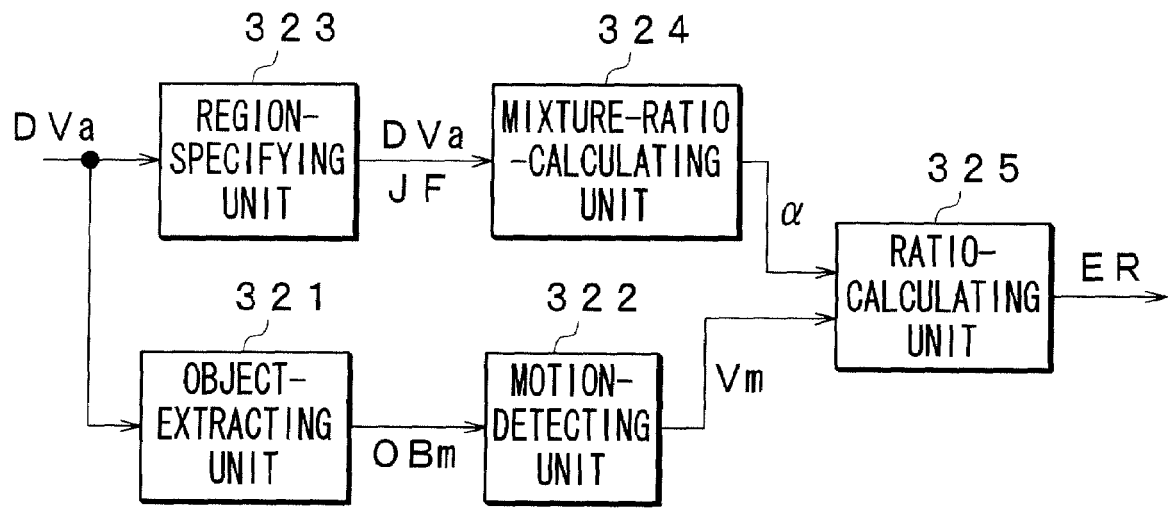
FIG. 8 is a functional block diagram of an exposure-time-ratio-setting section.

FIG. 8 is a functional block diagram of the exposure-time-ratio-setting section 32. An object-extracting unit 321 of the exposure-time-ratio-setting section 32 coarsely extracts an image object OBm corresponding to a moving object included in the target image based on the image signal DVa and supplies the extracted image object OBm to a motion-detecting unit 322. For example, by detecting a profile of an image object that corresponds to a moving object in a foreground as described above, the image object is coarsely extracted and supplied to the motion-detecting unit 322. It is to be noted that the image object OBm means an image corresponding to an object in the real world to be subject by imaging.

Further, the object-extracting unit 321 may coarsely extract the image object OBm corresponding to the moving object in the foreground from difference between a background image stored in a background memory installed inside and the target image, for example.

The motion-detecting unit 322 detects, by using the above-mentioned motion-vector-detection methods, a motion amount vm of an inter-frame motion vector of the coarsely extracted image object OBm and supplies it to a ratio-calculating unit 325. Further, when plural moving image objects are included, the motion-detecting unit 322 obtains the inter-frame motion vector for each image object and determines the motion amount vm of one inter-frame motion vector from the obtained plural inter-frame motion vectors by using any statistical methods. As the statistical methods, a simple averaging method, a weighted averaging method that objects are weighted according to their display area or display position and then, averaged, and a median method, etc. can be employed.

A region-specifying unit 323 specifies a foreground region that is moving portion, a background region that is still portion, and a covered background region and uncovered background region that are mixed regions, in the target image and supplies a mixture-ratio-calculating unit 324 with region information JF indicative of a specified result thereof.

Figure 9:
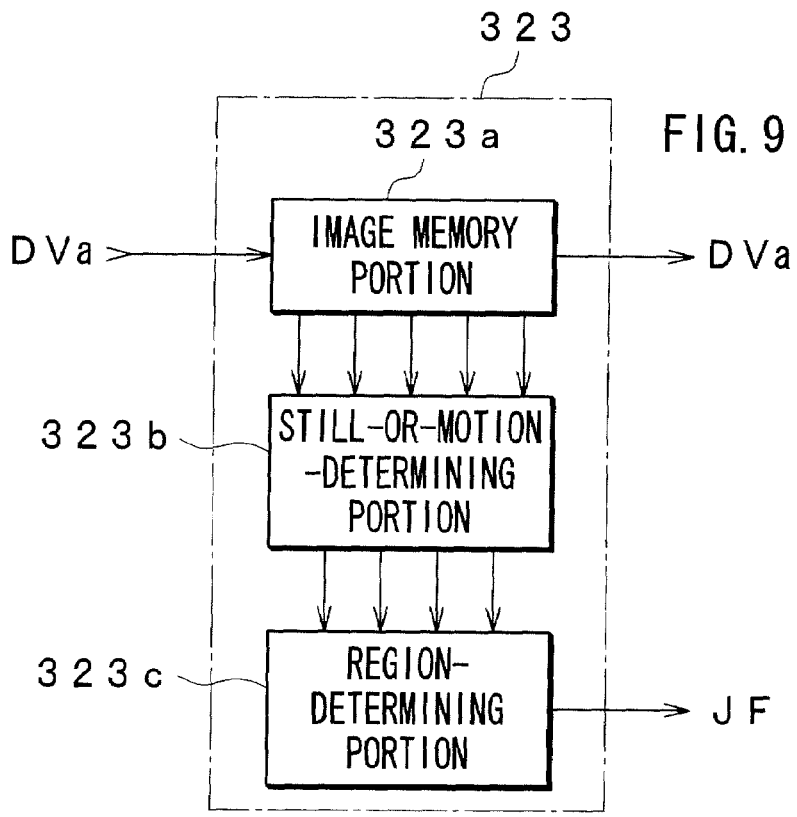
FIG. 9 is a functional block diagram of region-specifying unit.

FIG. 9 is a functional block diagram of the region-specifying unit 323. An image memory portion 323a stores the input image signal DVa for each frame. The image memory portion 323a stores, if supposing an image of a (t) frame to be a target image, images of (t−2) frame that is a second previous frame before (t) frame, (t−1) frame that is a first previous frame before (t) frame, (t) frame, (t+1) frame that is a first following frame after (t) frame, and (t+2) frame that is a second following frame after (t) frame.

A still-or-motion-determining portion 323b obtains an absolute value of difference between frames for each two consecutive frames to determine whether the absolute value of difference between frames is more than a predetermined threshold value Th or not, and it determines to be motion one if the absolute value of difference between frames is more than a predetermined threshold value Th or to be still one if the absolute value of difference between frames is not more than a predetermined threshold value Th.

A region-determining portion 323c performs a region-determining processing as shown in FIG. 10 which of a foreground region, a background region, a covered background region that is mixed region or an uncovered background region that is mixed region, a pixel belongs to, by using a determined result obtained in the still-or-motion-determining portion 323b.

For example, first, a pixel that is a still one according to a still-or-motion-determining result of (t−1) frame and (t) frame is determined to be a pixel belonged to the background region. A pixel that is a still one according to a still-or-motion-determining result of (t) frame and (t+1) frame is also determined to be a pixel belonged to the background region. Next, a pixel that is a still one according to a still-or-motion-determining result of (t−2) frame and (t−1) frame and that is a motion one according to a still-or-motion-determining result of (t−1) frame and (t) frame is determined to be a pixel belonged to the covered background region. Further, a pixel that is a motion one according to a still-or-motion-determining result of (t) frame and (t+1) frame and that is a still one according to a still-or-motion-determining result of (t+1) frame and (t+2) frame is determined to be a pixel belonged to the uncovered background region. Thereafter, a pixel that is a motion one according to a still-or-motion-determining result of (t−1) frame and (t) frame and that is a motion one according to a still-or-motion-determining result of (t) frame and (t+1) frame is determined to be a pixel belonged to the foreground region.

A mixture-ratio-calculating unit 324 calculates a mixture ratio $\alpha$ based on the image signal DVa and the region information JF that is supplied from the region-specifying unit 323, and supplies the ratio-calculating unit 325 with the calculated mixture ratio $\alpha$. This mixture ratio $\alpha$ is a value indicative of a ratio of background components with respect to the pixel value, as described above.

Figure 11:
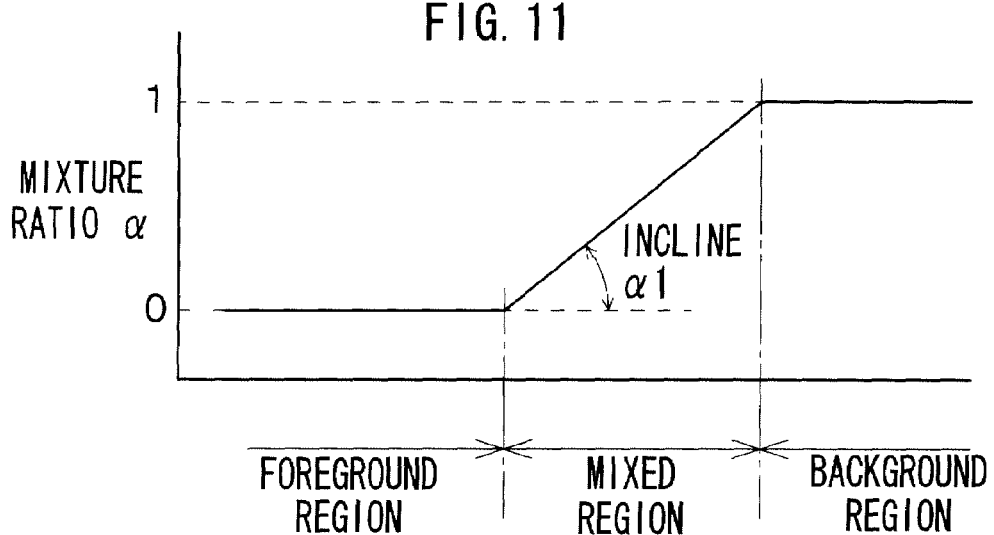
FIG. 11 is a diagram for showing a most suitable mixture ratio.

Herein, by supposing that an object corresponding to the foreground moves uniformly during a period of exposure time, the mixture ratio $\alpha$ of pixel belonged to the mixed region varies linearly, corresponding to a change in the pixel position. For example, in a case where the change in the pixel position is a one-dimensional one, a variation of the mixture ratio $\alpha$ is represented by a straight line. Further, on the assumption that a period of time of one frame is short and thus, an object that corresponds to the foreground is a rigid body and moves with uniform speed, an incline of the mixture ratio $\alpha$ indicates to an inverse ratio of a motion amount vs of the foreground within a period of exposure time. It is to be noted that if mixture ratios $\alpha$ of plural mixed regions are calculated to obtain the plural mixture ratios $\alpha$, one mixture ratio $\alpha$ is calculated by utilizing the above-mentioned statistical methods. It is to be noted that FIG. 11 indicates an ideal mixture ratio $\alpha$, in which mixture ratio $\alpha=0$ in the foreground while mixture ratio $\alpha=1$ in the background. An incline $\alpha 1$ of the mixture ratio $\alpha$ in the mixed region indicates an inverse of the motion amount vs in the period of exposure time.

The ratio-calculating unit 323 calculates an inverse of the incline $\alpha 1$ in the mixed region based on the mixture ratio $\alpha$ received from the mixture-ratio-calculating unit 324, to obtain the motion amount vs within a period of exposure time. Further, it divides the motion amount vs within a period of exposure time by a motion amount vm of inter-frame motion vector supplied from the motion-detecting unit 322 to set it as an exposure time ratio ER indicative of a ratio of the period of exposure time with respect to the target image interval and supply it to the blur-amount-setting section 33.

A blur-amount-calculating unit 331 of the blur-amount-setting section 33 multiplies a motion amount of the motion vector received from the motion-vector-setting section 31 for each pixel by the exposure time ration ER to calculate a motion blur amount MBa for each pixel and supplies it to a motion-blur-amount-selecting unit 332.

The motion-blur-amount-selecting unit 337 can receive the motion blur amount MBb when receiving a motion blur amount MBb as the information ET from outside, so that it selects any one from the motion blur amount MBa supplied from the blur-amount-calculating unit 331 and the motion blur amount MBb input from outside to supply the processing-region-setting section 36 and the processing-coefficient-setting section 37 with it as a motion blur amount MBp.

The target-pixel-setting section 35 sets a plurality of images to be processed, which include a target image, detects pixels on the images to be processed corresponding to a target pixel in the target image based on the image motion information vp set by the motion-vector-setting section 31, and sets the detected pixel as a target pixel in each of the images to be processed. It also supplies the processing-region-setting section 36 with image signals of the plurality of images to be processed in each of which the target pixel is set.

For example, if supposing an image of a (t) frame to be a target image, images of (t−1), (t), and (t+1) frames are set to images to be processed. In this case, based on the motion vector vp, pixels on images of the (t−1) frame and (t+1) frame corresponding to the target pixel in the target image are set as target pixels. Moreover, an image signal DVa(t) on an image to be processed in the (t) frame is supplied to a (t) frame tap selection unit 362 of the processing-region-setting section 36; an image signal DVa(t−1) on an image to be processed in the (t−1) frame in which the target pixel is set is supplied to a (t−1) frame tap selection unit 361; and an image signal DVa(t+1) on an image to be processed in the (t+1) frame in which the target pixel is set is supplied to a (t+1) frame tap selection unit 363, respectively.

It to be noted that if the target pixel in the target image is moved by the motion vector vp in the (t+1) frame, by moving an image of the (t+1) frame back by the motion vector vp, a position of the target pixel in the target image agrees with that of target pixel in the post-movement (t+1) frame, thereby enabling processing regions to be easily set in the processing-region-setting section 36.

Further, a reference target image is not limited to an image of the (t) frame but may be an image of the (t−1) or (t+1) frame. Moreover, with reference to setting any pixel in the target image as a target pixel, the target pixel is specified from the outside or pixels in the target image are sequentially specified automatically as the target pixel. This enables motion-blur-removing processing to be performed only on a desired pixel or to be automatically performed on an entirety of the target image. Further, by specifying a range from the outside and sequentially specifying pixels in the range as the target pixel automatically, it is possible to perform motion-blur-removing processing on a desired range.

The (t−1) frame tap selection unit 361 of the processing-region-setting section 36 sets a processing region that corresponds to a target pixel in the image to be processed, which is supplied from the target-pixel-setting section 35, based on the motion blur amount MBp set in the blur-amount-setting section 33 and a motion direction corresponding to the motion vector vp. Further, it supplies a blur-removing-processing unit 381 of the pixel-value-generating section 38 with a pixel value of the processing region.

Figure 12:
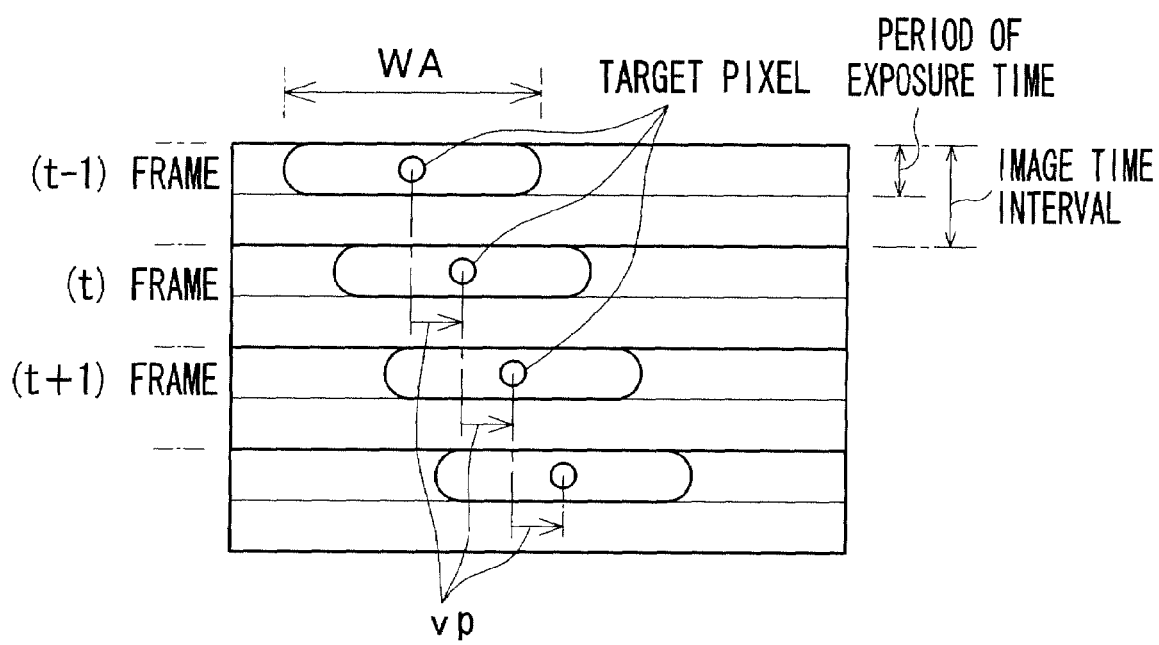
FIG. 12 is a diagram for explaining a processing region.

FIG. 12 shows processing regions, in which processing regions WA are set on the basis of the target pixels indicated by circles. If storing beforehand any processing coefficients in the processing-coefficient-setting section 37 based on the motion blur amount and the motion direction, the processing region WA is spatially set so that as shown in FIG. 13A, the processing region WA can be set corresponding to the motion blur amount MBp in a motion direction indicated by an arrow on the basis of a target pixel indicated a black circle. Alternatively, if storing beforehand specific processing coefficients, for example, processing coefficients when the motion direction is a horizontal direction, in the processing-coefficient-setting section 37, the processing region WA corresponding to the motion blur amount MBp can be set corresponding to a motion direction indicated by an arrow shown in FIG. 13B with it being wide enough in a direction perpendicular to the motion direction on the basis of the target pixel indicated by a black circle so that pixel values, which are linear-combined with the processing coefficients, can be generated at pixel positions indicated by the triangle symbols by using interpolation or the like. For example, if a motion direction when the processing coefficients are generated is a horizontal direction and a motion blur having a motion direction with an angle difference of 0 with respect to the horizontal one occurs, as shown in FIG. 14, a pixel value DPw of a position Pwa indicated by a triangle symbol is calculated by Equation 3 using pixel values of peripheral pixel positions Pw1, Pw2, Pw3, and Pw4.

$$DPwa = (1-\beta h) \times (1-\beta v) \times DPw1 + \beta h \times (1-\beta v) \times DPw2 + (1-\beta h) \times \beta v \times DPw3 + \beta h \times \beta v \times DPw4 \quad (3)$$

where $\beta h = \cos\theta$, $\beta v = \sin\theta$, DPw1 is a pixel value of pixel position Pw1, and DPw2 to DPw4 are pixel values of pixel positions Pw2 to Pw4, respectively.

The more a motion amount of a subject in a period of frame time is, a motion blur amount MBp is large and hence the smaller, a motion amount thereof is, a motion blur amount is small. Therefore, if the motion blur amount MBp is large, the processing region WA is set so that it can be set wider along a motion direction.

As in the case of the (t−1) frame tap selection unit 361, the (t) frame tap selection unit 362 and the (t+1) frame tap selection unit 363 also set processing regions, respectively, as described above in accordance with the motion blur amount MBp set in the blur-amount-setting section 33 and the motion direction corresponding to the motion vector vp, on the basis of the target pixel in each of the images to be processed supplied from the target-pixel-setting section 35, respectively. Moreover, they supply pixel values in the processing regions to blur-removing-processing units 382 and 383, respectively.

The processing-coefficient-setting section 37 is constituted of a memory, in which specific processing coefficients corresponding to motion blur amount MBp or processing coefficients corresponding to the motion blur amount MBp and the motion direction corresponding to the motion vector vp are stored beforehand. If storing the specific processing coefficients which are generated corresponding to motion blur amount MBp, the processing-coefficient-setting section 37 reads out of the memory the specific processing coefficients that correspond to the motion blur amount MBp supplied from the blur-amount-setting section 33 and supplies them to the blur-removing-processing units 381, 382, and 383, thereby setting the processing coefficients. Alternatively, if storing the processing coefficients based on the motion blur amount MBp and the motion direction corresponding to the motion vector vp, it reads out of the memory the processing coefficients that correspond to a motion direction based on the motion blur amount MBp supplied from the blur-amount-detecting section 33 and the motion vector vp selected in the motion-vector-selecting unit 312 and supplies them to the blur-removing-processing units 381, 382, and 383, thereby setting the processing coefficients.

When receiving the specific processing coefficients based on the motion blur amount MBp from the processing-coefficient-setting section 37, the blur-removing-processing unit 381 in the pixel-value-generating section 38 generates pixel values of pixel positions that are linear-combined with the processing coefficients by means of interpolation or the like using the pixel values in the processing region supplied from the (t−1) frame tap selection unit 361. Further, it performs the linear combination of the generated pixel values and the supplied processing coefficients to generate the blur-removed pixel value and supply it to an integration section 39. The blur-removing-processing unit 382 generates pixel values of pixel positions that are linear-combined with the processing coefficients by means of interpolation or the like using the pixel values in the processing region supplied from the (t) frame tap selection unit 362. Further, it performs the linear combination of the generated pixel values and the supplied processing coefficients to generate the blur-removed pixel value and supply it to the integration section 39. The blur-removing-processing unit 383 performs linear-combination by using pixel values in the processing region supplied from the (t+1) frame tap selection unit 362 and the processing coefficients supplied from the processing-coefficient-setting section 37 to generate the blur-removed pixel value and supply it to the integration section 39.

Further, when receiving the processing coefficients based on the motion blur amount and the motion direction from the processing-coefficient-setting section 37, the blur-removing-processing unit 381 in the pixel-value-generating section 38 performs linear combination using the pixel values in the processing region supplied from the (t−1) frame tap selection unit 361 and the supplied processing coefficients to generate the blur-removed pixel value and supply it to the integration section 39. Similarly, the blur-removing-processing unit 382 performs linear combination using the pixel values in the processing region supplied from the (t) frame tap selection unit 362 and the supplied processing coefficients to generate the blur-removed pixel value and supply it to the integration section 39. Further, the blur-removing-processing unit 383 performs linear combination using the pixel values in the processing region supplied from the (t+1) frame tap selection unit 363 and the supplied processing coefficients to generate the blur-removed pixel value and supply it to the integration section 39.

Equation 4 indicates a case of calculating multiply and accumulation as one example of linear combination of pixel values in the processing region and processing coefficients.

$$q' = \sum_{i=0}^{n} di \times ci \qquad (4)$$

In the Equation 4, q' indicates a pixel value of a pixel from which blur is removed. ci (i is an integer of 1 through n, indicating each of the pixels in a processing range) represents pixel values in the processing region. Further, di indicates processing coefficients.

The integration section 39 integrates the blur-removed pixel values supplied from the blur-removing-processing units 381 to 383 to thereby generate a pixel value of a target pixel in a prediction image, which is an image whose motion blurs have been removed, and outputs it as an image signal DVout. In the integration of the pixel values, any statistical processing is assumed to be used. For example, a simple averaging method, a weighted averaging method, and a median filter method, etc. can be employed. By the weighted averaging method, an average value is calculated by weighting, for example, 2:6:2 to pixel values of the (t−1) frame:pixel values of the (t) frame:pixel values of the (t+1) frame.

Figure 15:
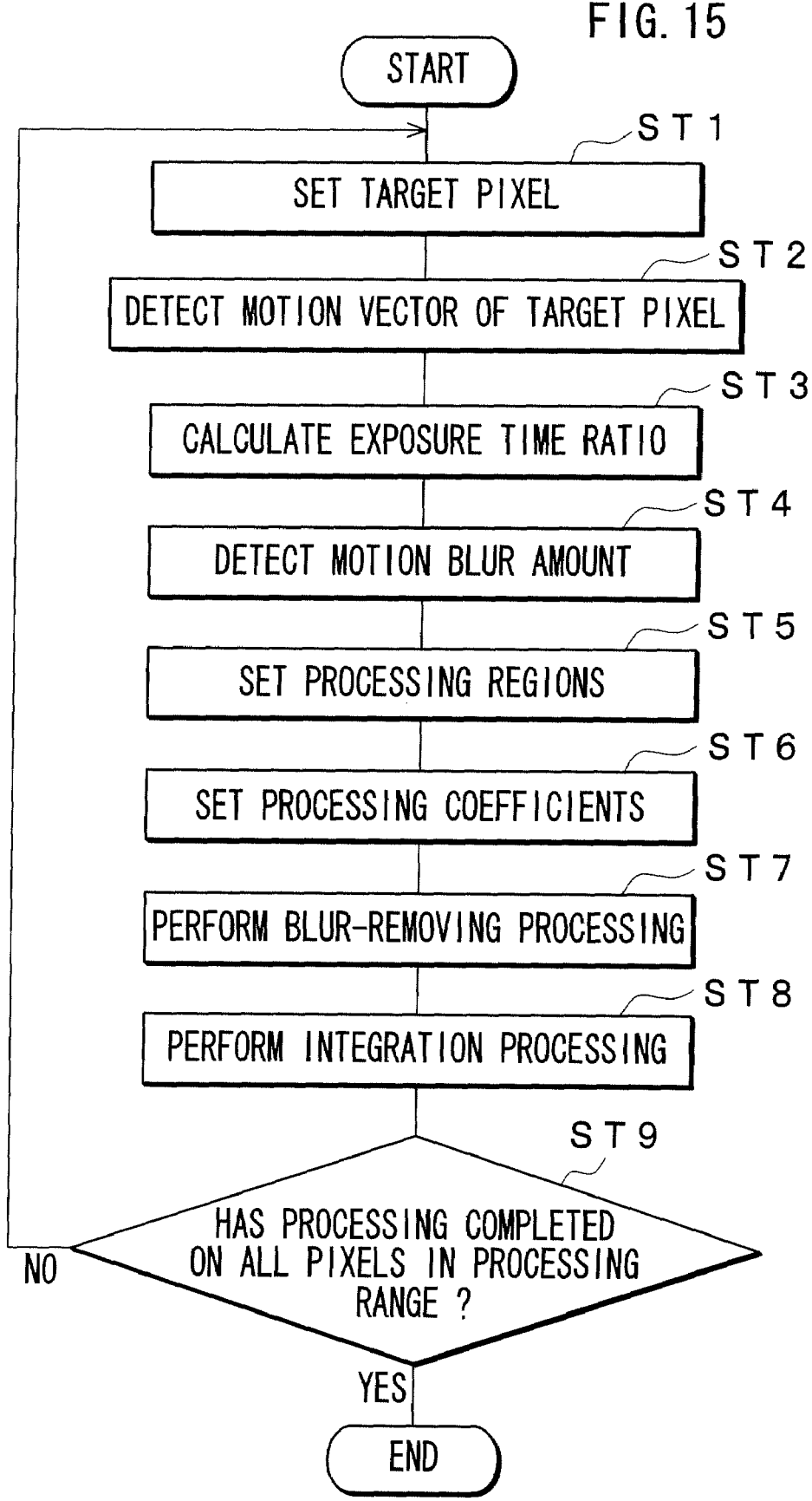
FIG. 15 is a flowchart for showing image-processing.

FIG. 15 shows a flowchart in the case of performing image-processing by using software. At step ST1, the CPU 201 sets a target pixel, from which motion blur is to be removed, in a target image and proceeds to step ST2. At the step ST2, the CPU 201 detects a motion vector of the target pixel and proceeds to step ST3. At the step ST3, the CPU 201 calculates exposure time ratio. At step ST4, the CPU 201 detects a motion blur amount of the target pixel. In other words, it performs calculation processing on the motion vector detected at the step ST2 and the exposure time ratio calculated at the step ST3 to detect the motion blur amount of the target pixel in a period of exposure time.

At step ST5, the CPU 201 sets processing regions. In other words, the CPU 201 sets images to be processed based on the target pixel in the target image and sets target pixels in the images to be processed. Moreover, by using as a reference the target pixels in the images to be processed, it sets processing regions that correspond to the motion blur amount obtained at the step ST4 and the processing regions that correspond to a motion direction corresponding to the motion vector detected at the step ST2, and then proceeds to step ST6. At the step ST6, the CPU 201 sets processing coefficients. In this processing coefficient setting, it sets specific motion-blur-removing processing coefficients based on the motion amount or the motion-blur-removing processing coefficients based on the motion amount and the motion direction detected at the step ST2.

At the step ST7, the CPU 201 performs blur-removing processing on the images to be processed by using the processing coefficients set at the step ST6. In other words, it performs calculation processing on the pixel values in the processing regions set at the step ST5 and the processing coefficients set at the step ST6 on each image to be processed to calculate blur-removed pixel values for each target pixel of the image to be processed and then, proceeds to step ST8.

At the step ST8, the CPU 201 performs integration processing on the pixel values calculated at the step ST7 for each image to be processed and outputs an obtained pixel value as a motion-blur-removed pixel value of the target pixel and then, proceeds to step ST9. At the step ST9, the CPU 201 decides whether blur-removing processing has completed on all pixels in the processing ranges and, if any one of the pixels is not undergone yet the blur-removing processing, it returns to the step ST1 while if blur removing has completed on all pixels in the processing ranges, it ends the image processing on the target image.

By, thus, setting the target pixels in the images to be processed corresponding to the target pixel in the target image and performing motion-blur-removing processing on the image to be processed, it is possible to obtain pixel values by the motion-blur-removing processing that is successively performed on desired target pixels in a time direction. In other words, this is construction of a real world signal by utilizing stationary characteristic of a motion direction of the real world signal with respect to time axis, so that results of the motion-blur-removing processing on the images to be processed can be integrated, thereby enabling its processing accuracy to be improved.

The following will describe cases of obtaining through learning processing coefficients to be stored beforehand in the processing-coefficient-setting section 37 to perform blur-removing processing thereon and obtaining the processing coefficients from model equations to perform the blur-removing processing thereon.

Figure 16:
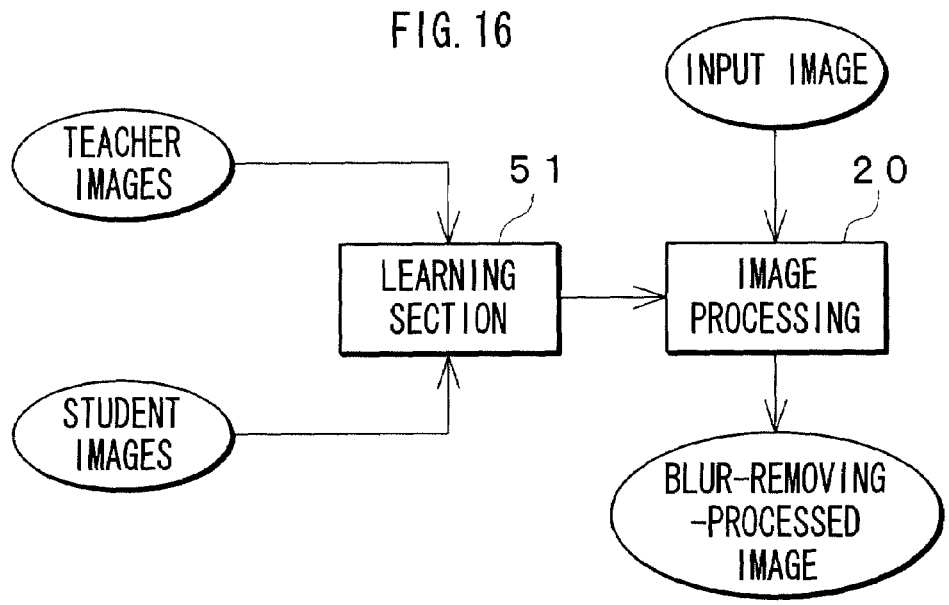
FIG. 16 is a diagram for showing a configuration in a case where blur-removing processing is performed by obtaining processing coefficients through learning.

FIG. 16 shows a configuration in a case where the blur-removing processing is performed by obtaining the processing coefficients through learning. A learning section 51 performs learning processing by using still images serving as teacher images and student images obtained by adding any motion blurs to each of the still image and stores processing coefficients obtained by this learning into the processing-coefficient-setting section 37 in the image-processing apparatus 20. The image-processing apparatus 20 sets processing regions corresponding to target pixels from an image containing a motion blur as an input image as described above and performs calculation processing by using pixel values in the processing regions and processing coefficients corresponding to the motion blur amount, which are stored in the processing-coefficient-setting section 37, thereby generating blur-removed pixel values.

Figure 17:
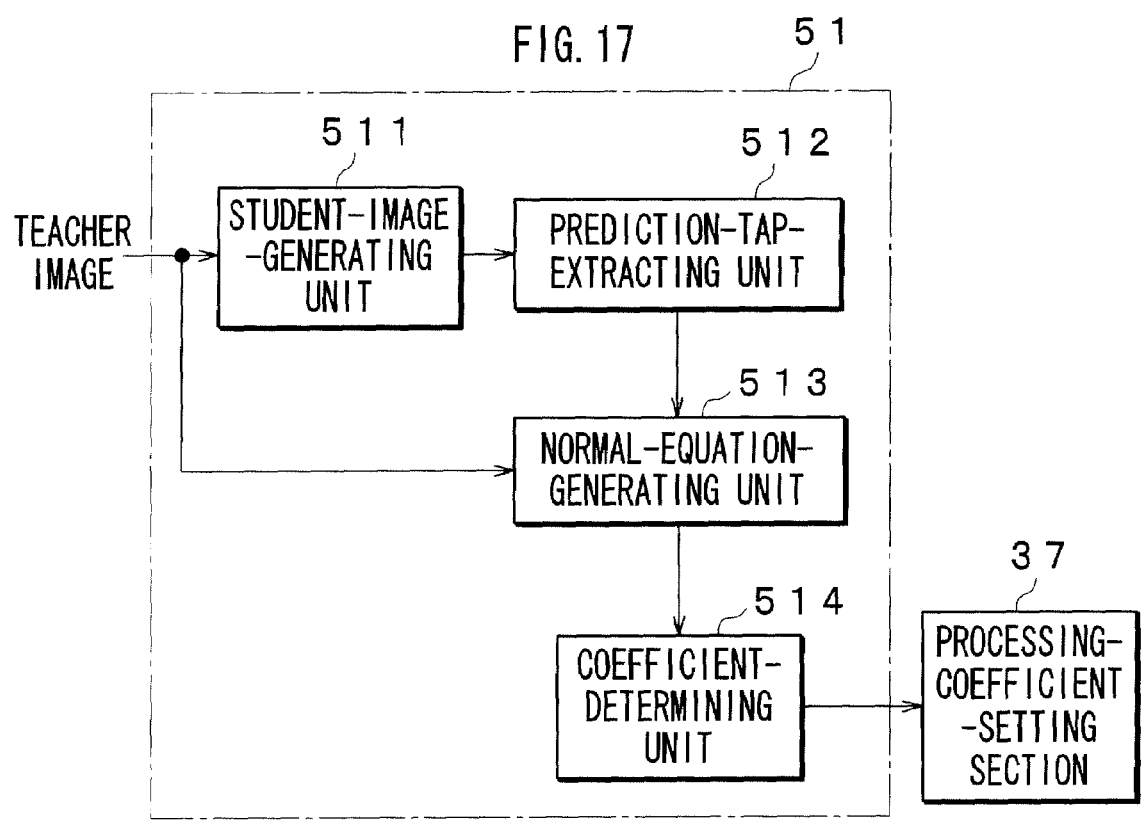
FIG. 17 is a functional block diagram of a learning section.

FIG. 17 is a functional block diagram of the learning section 51. A student-image-generating unit 511 in the learning section 51 generates the student images by adding any motion blurs corresponding to a motion amount or a motion direction and the motion amount to each of the teacher images serving as input images and supplies the student images to a prediction-tap-extracting unit 512.

The prediction-tap-extracting unit 512 sets as a prediction tap a plurality of pixels for a target pixel whose blurs are to be removed, extracts pixel values of the prediction tap from each of the student images, and outputs them to a normal-equation-generating unit 513.

The normal-equation-generating unit 513 generates a normal equation from pixel values of the prediction taps supplied from the prediction-tap-extracting unit 512 and pixel values of the teacher images and supplies it to a coefficient-determining unit 514. The coefficient-determining unit 514 calculates processing coefficients based on the normal equation supplied from the normal-equation-generating unit 513 and stores them in the processing-coefficient-setting section 37. The normal-equation-generating unit 513 and the coefficient-determining unit 514 will be described further.

In the above-described Equation 4, before learning, the processing coefficients $d_i$ are respectively undetermined ones. Learning is performed by inputting pixels of a plurality of teacher images (still images). In a case where there are m number of pixels of the teacher images and pixel values of the m number of pixels are described as "$q_k$ (k is an integer of 1 through m)", following Equation 5 is derived from the Equation 4.

$$qk \approx \sum_{i=0}^{n} di \times cik = qk' \quad (5)$$

In other words, by calculating a right side of the Equation 5, it is possible to obtain blur-removed pixel values $q_k'$, which are approximately equal to actual pixel values $q_k$ containing no motion blur. It is to be noted that an approximately equal symbol, not an equality symbol, is used in the Equation 5 because an error contains therein. In other words, this is because the blur removed pixel values obtained as a result of calculation of the right side do not strictly agree with pixel values on target pixels in an actual image having no motion blur and contain a predetermined error.

In the Equation 5, a processing coefficient $d_i$ that minimizes a sum of squares of the error, if obtained through learning, is considered to be an optimal coefficient to bring the blur removed pixel values $q_k$ close to the pixel values having no motion blur. Therefore, for example, by using m (which is an integer larger than n) number of pixel values $q_k$ gathered through the learning, such an optimal processing coefficient $d_i$ is determined according to the least-squares method.

A normal equation to obtain the processing coefficient $d_i$ in the right side of the Equation 5 according to the least-squares method can be given as Equation 6.

$$\begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & & \vdots \\ \vdots & \vdots & & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \begin{bmatrix} d_1 \\ d_2 \\ \vdots \\ \vdots \\ d_n \end{bmatrix} = \begin{bmatrix} \sum_{k=1}^{m} c_{1k} \times q_k \\ \sum_{k=1}^{m} c_{2k} \times q_k \\ \vdots \\ \vdots \\ \sum_{k=1}^{m} c_{nk} \times q_k \end{bmatrix} \quad (6)$$

Therefore, by solving the normal equation indicated in the Equation 6, the processing coefficient $d_i$ can be determined. Specifically, if matrixes of the normal equation indicated in the Equation 6 are defined as the following Equations 7 to 9, the normal equation is given as following Equation 10.

$$C_{MAT} = \begin{bmatrix} \sum_{k=1}^{m} c_{1k} \times c_{1k} & \sum_{k=1}^{m} c_{1k} \times c_{2k} & \cdots & \sum_{k=1}^{m} c_{1k} \times c_{nk} \\ \sum_{k=1}^{m} c_{2k} \times c_{1k} & \sum_{k=1}^{m} c_{2k} \times c_{2k} & \cdots & \sum_{k=1}^{m} c_{2k} \times c_{nk} \\ \vdots & \vdots & & \vdots \\ \vdots & \vdots & & \vdots \\ \sum_{k=1}^{m} c_{nk} \times c_{1k} & \sum_{k=1}^{m} c_{nk} \times c_{2k} & \cdots & \sum_{k=1}^{m} c_{nk} \times c_{nk} \end{bmatrix} \quad (7)$$

$$D_{MAT} = \begin{bmatrix} d1 \\ d2 \\ M \\ M \\ dn \end{bmatrix} \quad (8)$$

$$Q_{MAT} = \begin{bmatrix} \sum_{k=1}^{m} c_{1k} \times q_k \\ \sum_{k=1}^{m} c_{2k} \times q_k \\ \vdots \\ \vdots \\ \sum_{k=1}^{m} c_{nk} \times q_k \end{bmatrix} \quad (9)$$

$$C_{MAT} D_{MAT} = Q_{MAT} \quad (10)$$

As indicated in the Equation 8, elements of the matrix $D_{MAT}$ are processing coefficients to be obtained. Therefore, in the Equation 10, once the matrix $C_{MAT}$ on the left side and the matrix $Q_{MAT}$ on the right side are determined, it is possible to calculate the matrix $D_{MAT}$ (i.e., processing coefficient $d_i$) by any matrix solving methods. Specifically, as indicated in the Equation 7, elements of the matrix $C_{MAT}$ can be calculated if prediction taps $c_{ik}$ are already known. Since the prediction taps $c_{ik}$ are extracted by the prediction-tap-extracting unit 512, the normal-equation-generating unit 513 can calculate the elements of matrix $C_{MAT}$ by utilizing the respective prediction taps $c_{ik}$ supplied from the prediction-tap-extracting unit 512.

Also, as indicated in the Equation 9, elements of the matrix $Q_{MAT}$ can be calculated if the prediction taps $c_{ik}$ and the pixel values $q_k$ of the still images are already known. The prediction taps $c_{ik}$ are the same as those included in the elements of matrix $C_{MAT}$ and the pixel values $q_k$ correspond to pixels of the teacher images with respect to target pixels (pixels of the student images) contained in each of the prediction taps $c_{ik}$. Therefore, the normal-equation-generating unit 513 can calculate the elements of matrix $Q_{MAT}$ by utilizing the prediction taps $c_{ik}$ supplied from the prediction-tap-extracting unit 512 and the teacher images.

Thus, the normal-equation-generating unit 513 calculates the elements of matrixes $C_{MAT}$ and $Q_{MAT}$ and supplies results of the calculations to the coefficient-determining unit 514.

The coefficient-determining unit 514 calculates the processing coefficients $d_i$, which are the elements of matrix $D_{MAT}$ of the above-described Equation 8. Specifically, the normal equation of the above-described Equation 10 can be changed into following Equation 11.

$$D_{MAT} = C_{MAT}^{-1} Q_{MAT} \quad (11)$$

In the Equation 11, the elements of matrix $D_{MAT}$ of the left side are the processing coefficients $d_i$ to be obtained. Further, the elements of matrixes $C_{MAT}$ and $Q_{MAT}$ are supplied from the normal-equation-generating unit 513. Therefore, when having been supplied with the elements matrixes $C_{MAT}$ and $Q_{MAT}$ from the normal-equation-generating unit 513, the coefficient-determining unit 514 calculates a matrix of the right side of the Equation 11 to calculate the matrix $D_{MAT}$ and stores a result of the calculation (processing coefficients $d_i$) in the processing-coefficient-setting section 37. In this case, by performing the above-described learning with the motion amount v being changed, it is possible to store processing coefficients that correspond to the motion amount in the processing-coefficient-setting section 37.

On the basis of, for example, a target pixel, pixels that fall in a range of "3×motion amount+9 pixels" in a motion direction are selected as a prediction tap, Further, if pixels that fall in a range of "2×motion amount+3 pixels" are defined as a prediction tap, the number in the tap can be decreased to simplify the configuration thereof. Moreover, on the selection of the prediction tap, the prediction taps can be discretely selected according to a motion amount v. It is to be noted that the prediction taps to be selected correspond to pixels of the above-mentioned processing regions.

Figure 18:
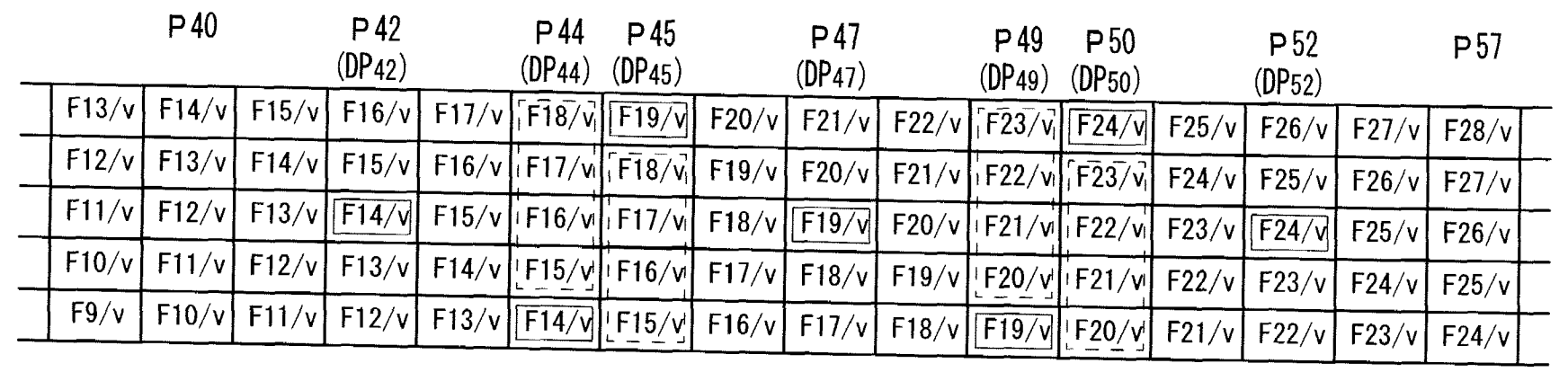

The following will describe the case of discretely selecting the prediction taps in accordance with the motion amount v, with reference to FIG. 18. For example, in the case of defining a pixel position P47 shown in FIG. 18 as a target pixel position and obtaining a pixel value F19 of a target pixel, Equation 12 holds true with taking into consideration a pixel position P45 where an element F19/v of the target pixel appears first and a pixel position P44 which is adjacent to the pixel position P45 and does not have the element F19/v of the target pixel as indicated by broken lines. It is to be noted that the pixel positions P44 and P45 are supposed to have pixel values $DP_{44}$ and $DP_{45}$.

$$F19 - F14 = (DP_{45} - DP_{44}) \times v \quad (12)$$

Similarly, Equation 13 holds true with taking into consideration a pixel position P49 where an element F19/v of the target pixel appears last and a pixel position P50 which is adjacent to the pixel position P40 and does not have the element F19/v of the target pixel as indicated by broken lines.

$$F24 - F19 = (DP_{50} - DP_{49}) \times v \quad (13)$$

In this case, a level of pixel value F14 is obtained approximately utilizing a space correlation. For example, if a pixel position P42 has a high space correlation with its peripheral pixels, such an approximation as indicated in Equation 14 is established.

$$F14 \approx DP_{42} \quad (14)$$

Figures 19, 20:
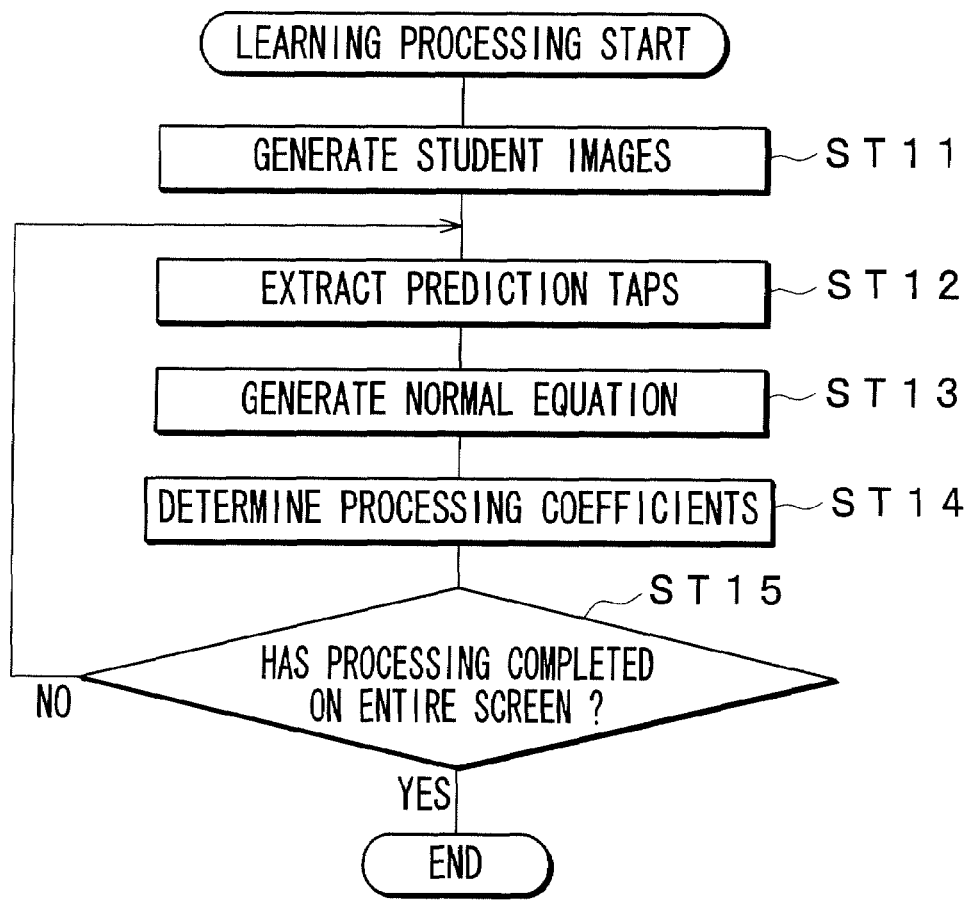
FIG. 19 is a diagram for explaining calculation of an activity.
FIG. 20 is a flowchart for showing processing to learn processing coefficients.

The space correlation, as referred to here, means a relationship represented by a magnitude of an activity of pixels. In other words, the activity refers to as a sum of differences among pixels adjacent to a reference pixel, for example. FIG. 19 is a diagram for explaining calculation of the activity. For example, activity AC (P42) of pixel position P42, which is given by following Equation 15, is differences between pixels in a total of nine pixels (3×3 pixels) around the pixel position P42. It is to be noted that in FIG. 19, the pixel position P42-U indicates a pixel one line above the pixel position P42, and the pixel position P42-L indicates a pixel one line below the pixel position P42, and so on.

$$
\begin{aligned}
AC(P42) = \quad & |DP_{41-U} - DP_{42-U}| + |DP_{42-U} - DP_{43-U}| + |DP_{41} - DP_{42}| + \\
& |DP_{42} - DP_{43}| + |DP_{41-L} - DP_{42-L}| + |DP_{42-L} - DP_{43-L}| + \\
& |DP_{41-U} - DP_{41}| + |DP_{41} - DP_{41-L}| + |DP_{42-U} - DP_{42}| + \\
& |DP_{42} - DP_{42-L}| + |DP_{43-U} - DP_{43}| + |DP_{43} - DP_{43-L}|
\end{aligned} \quad (15)
$$

Activity AC (P42) of a pixel represented by the pixel position P42 given by the Equation 15 is such that the smaller its value is, the higher a space correlation between the pixel of pixel position P42 and each of the peripheral pixels thereof is and hence a pixel value of the pixel position P42 is approximate to those of the peripheral pixels. Conversely, the larger an activity is, the lower a space correlation between the pixel of pixel position P42 and each of the peripheral pixels thereof and hence the pixel values of the pixel position P42 could be different from those of the peripheral pixels. In other words, it supposes that a higher space correlation means a smaller change in pixel values among pixels, so that it is considered that such a relationship as given by Equation 16 holds true.

$$F12/v = F13/v = F14/v = F15/v = F16/v \quad (16)$$

Therefore, if the activity AC (P42) is small, following Equation 17 is derived, so that the Equation 14 is considered to be established.

$$DP_{42}/v = (F12/v + F13/v + F14/v + F15/v + F16/v) = F14/v \quad (17)$$

Based on the results above, by changing the Equation 12 and substituting a relationship of the Equation 14 into it, F19 is obtained as a level if light made incident upon a pixel of an image having no motion blur as indicated by following Equation 18.

$$F19 = (DP_{45} - DP_{44}) \times v + DP_{42} \quad (18)$$

In a similar manner, Equation 19 is also established.

$$F19 = DP_{52} + (DP_{49} - DP_{50}) \times v \quad (19)$$

Through the above consideration, to obtain the pixel value F19 of the target pixel, pixel positions P42, P44, P45, P49, P50, and P52 can be obtained, so that by using pixel position P47 of the target pixel as reference, pixels of pixel positions P42, P44, P45, P49, P50, and P52 can be also used as a prediction tap.

FIG. 20 is a flowchart for showing the learning processing of processing coefficients. At step ST11, the student images are generated from the teacher images. In other words, by adding a motion blur to each of the teacher images, the student images are generated to each of which the motion blur is added.

At step ST12, prediction taps are extracted from the student images. At step ST13, a normal equation is generated from the prediction taps and pixels of the teacher images.

At step ST14, the normal equation generated at step ST13 is solved to thereby determine the processing coefficients and stores them in the processing-coefficient-setting section 37. If specifying the motion direction and switching only the motion blur amount to determine the processing coefficients, the processing coefficients are stored corresponding to the motion blur amount. Further, if switching the motion blur amount and the motion direction to determine the processing coefficients, the processing coefficients are stored corresponding to the motion blur amount and the motion direction.

At step ST15, it is determined whether the processing is performed on all pixels and, if the processing is not performed yet on any of the pixels, processing starting from step ST12 repeats on new pixels while if the processing is completed on all pixels, the learning processing ends.

By performing the above processing to generate processing coefficients for removing a motion blur through learning and storing them in the processing-coefficient-setting section 37, the motion-blur-removing processing can be performed.

Further, to detect a magnitude of an activity as described above, that is, to detect whether there is a space correlation or not, classes are categorized in accordance with the magnitude of the activity to change processing regions corresponding to a class code, which is a result of the class categorization, thereby enabling accuracy for blur-removing to be improved.

In this case, the processing-region-setting section 36 extracts class taps that corresponds to a target pixel, determines a class code from the extracted class taps, sets processing regions to be processed that correspond to the target pixels according to the class code, and supplies pixel values in the processing regions to the pixel-value-generating section 38. Further, the determined class code is supplied from the processing-region-setting section 36 to the processing-coefficient-setting section 37 so that processing coefficients that correspond to the motion blur amount MBp, the motion direction corresponding to the motion vector vp, and the class code may be read out of the memory and supplied to the pixel-value-generating section 38.

In this case, in a case where class categorization is performed based on the magnitude of an activity, pixels used in calculation of the activity are extracted as the class tap as described with reference to FIGS. 18 and 19. The extracted class taps are used to obtain the activity as described above, and then, based on the activity thus obtained, the class code is determined. For example, if activities AC (P42) and AC (P52) are obtained when the activity AC (P42) is found to be smaller than the activity AC (P52), the class code is set to "1" and, when the activity AC (P52) is smaller than the activity AC (P42), the class code is set to "2" so that the class code may subsequently be supplied to the processing-coefficient-setting section 37.

Moreover, the processing-region-setting section 36 sets processing regions that correspond to the target pixels in accordance with the class code. For example, if the class code is "1", pixel values of pixel positions P42, P44, and P45 are supplied as pixel values in the processing region to the pixel-value-generating section 38 because the pixel position P42 has a higher space correlation than that of the pixel position P52. Alternatively, if the class code is "2", pixel values of pixel positions P49, P50, and P52 are supplied as pixel values in the processing region to the pixel-value-generating section 38 because the pixel position P52 has a higher space correlation than that of the pixel position P42.

The processing-coefficient setting section 37 stores beforehand processing coefficients that are not only obtained by specifying the motion direction and switching only the emotion blur amount or changing the motion blur amount and the motion direction but also generated for class code. Herein, if storing the specific processing coefficients based on the motion blur amount MBp and the class code, the processing-coefficient-setting section 37 reads out of its memory the specific processing coefficients corresponding to the motion blur amount MBp that is supplied from the blur-amount-setting section 33 and the class code that is supplied from the processing-coefficient-setting section 36, and supplies them to the blur-removing-processing units 381, 382, and 383 to set the processing coefficients. Alternatively, if storing the processing coefficients based on the motion blur amount MBp, the motion direction corresponding to the motion vector vp, and the class code, it reads out of its memory the processing coefficients corresponding to the motion blur amount MBp that is supplied from the blur-amount-setting section 33, the motion direction based on the motion vector vp selected in the motion-vector-selecting unit 312, and the class code that is supplied from the processing-coefficient-setting section 36, and supplies them to the blur-removing-processing units 381, 382, and 383 to set the processing coefficients.

The blur-removing-processing units 381 to 383 in the pixel-value-generating section 38 perform calculation processing by using the pixel values in the processing regions and the processing coefficients supplied from the processing-coefficient-setting section 37 to generate the blur-removed pixel values and supply them to the integration section 39. The integration section 39 integrates the pixel values supplied from the blur-removing-processing units 381 to 383 and outputs a pixel value of the target pixel in the prediction image, from which any motion blurs are already removed.

Figure 21:
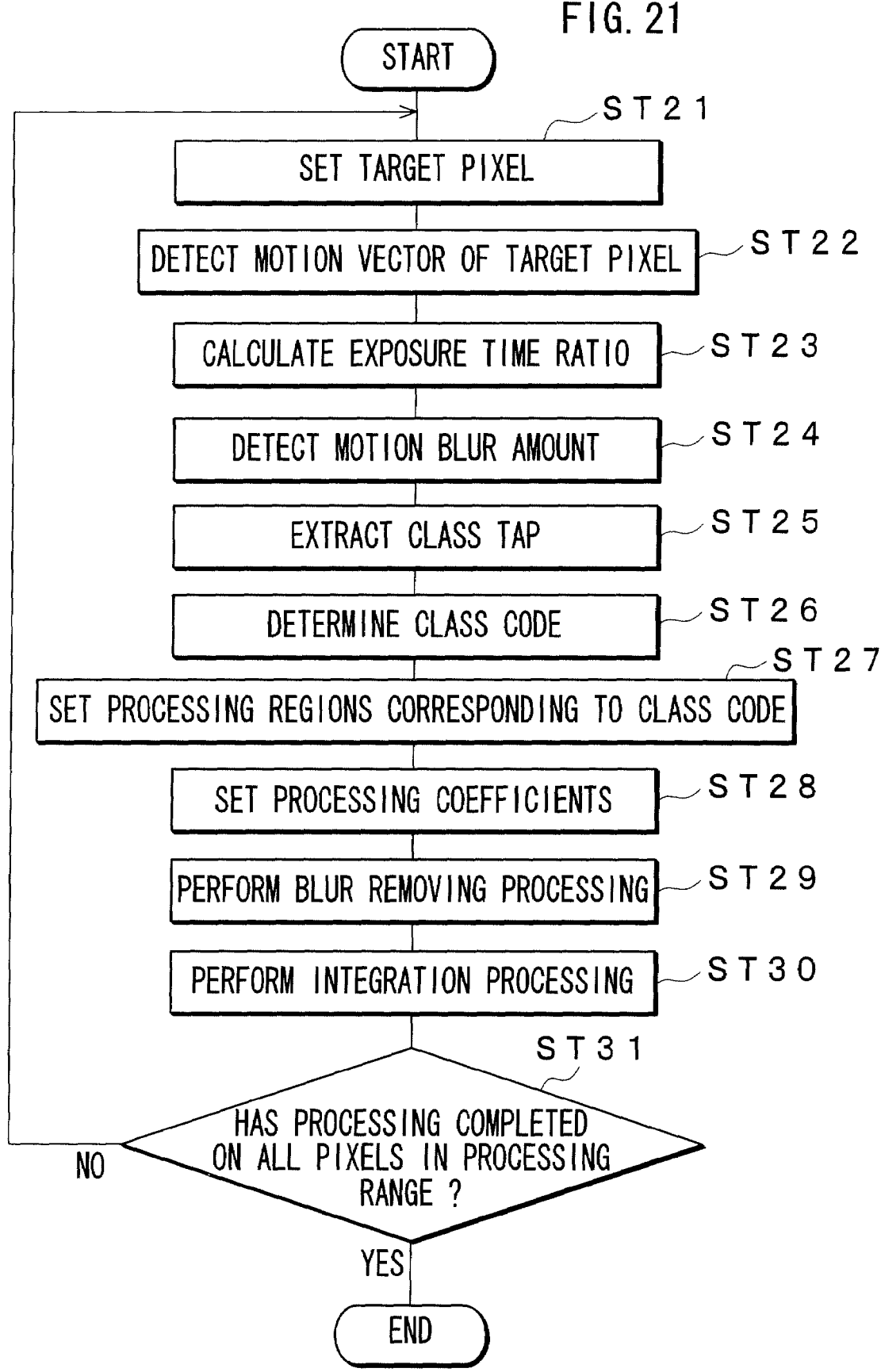
FIG. 21 is a flowchart of image processing by use of class categorization.

FIG. 21 shows a flowchart of image processing by use of the class categorization. At step ST21, the CPU 201 sets a target pixel whose motion blurs are to be removed in the target image and then proceeds to step ST22. At the step ST22, the CPU 201 detects a motion vector of the target pixel and proceeds to step ST23. At the step ST23, the CPU 201 calculates exposure time ratio. At step ST24, the CPU 201 detects a motion blur amount of the target pixel. In other words, it performs calculation processing by using the motion vector detected at the step ST22 and the exposure time ratio calculated at the step ST23, thereby detecting the motion blur amount of the target pixel in a period of exposure time.

At step ST25, the CPU 201 extracts a class tap corresponding to the motion blur amount obtained at the step ST24 and proceeds to step ST26. At the step ST26, the CPU 201 categorizes classes and determines a class code from the class tap. At step ST27, the CPU 201 sets processing regions corresponding to the class code to the motion direction corresponding to the motion vector detected at the step ST22.

At step ST28, the CPU 201 sets the processing coefficients by using the class code. In this setting of the processing coefficients, the specific motion-blur-removing processing coefficients that correspond to the motion blur amount of the target pixel detected at the step ST24 and the class code determined at the step ST26, or the motion-blur-removing processing coefficients that correspond to the motion amount, the motion direction that corresponds to the motion vector detected at the step ST22, and the class code are set, and then the processing proceeds to step ST29.

At the step ST29, the CPU 201 performs blur-removing processing on each of the images to be processed by using the processing coefficients set at the step ST28. In other words, it performs calculation processing on each image to be processed using the pixel values in the processing regions set at the step ST27 and the processing coefficients set at the step ST28, thereby calculating blur-removed pixel values for each target pixel in the images to be processed, and then, it proceeds to step ST30.

At the step ST30, the CPU 201 integrates the pixel values calculated for each image to be processed at the step ST29 and outputs the obtained pixel value as a motion-blur removed pixel value of the target pixel and then proceeds to step ST31. At the step ST31, the CPU 201 decides whether blur-removing processing is completed on all pixels in a processing range and, if the blur-removing processing is not performed yet on any of the pixels, it returns to the step ST21 while if the blur-removing processing is completed on all pixels in the processing range, it ends the image processing on the target image.

Figure 22:
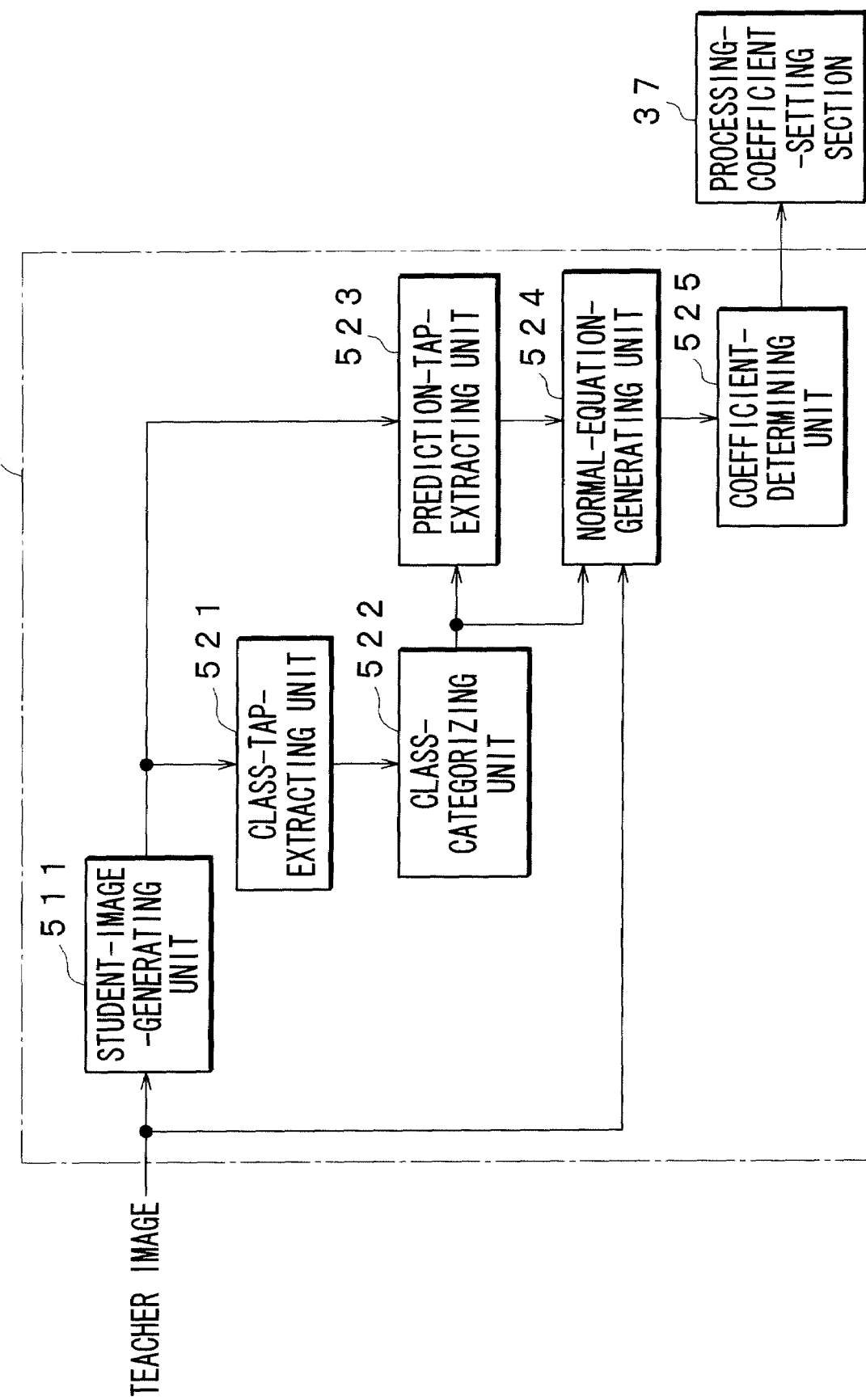
FIG. 22 is a functional block diagram of a learning section in the case of executing class categorization.

The following will describe learning of processing coefficients in the case of performing class categorization. FIG. 22 is a functional block diagram of a learning section 52 in the case of categorizing classes. It is to be noted that components of FIG. 22 that correspond to those of FIG. 17 are indicated by the same symbols, detailed descriptions of which will be omitted.

A class-tap-extracting unit 521 of the learning section 52 selects a class tap as described above, and supplies the selected class tap to a class-categorizing unit 522. The class-categorizing unit 522 categorizes classes, as described above, to determine a class code and supplies it to a prediction-tap-extracting unit 523 and a normal-equation-generating unit 524.

The prediction-tap-extracting unit 523 switches prediction taps in accordance with the class code to extract and supply it to the normal-equation-generating unit 524.

Being the same as the normal-equation-generating unit 513 of FIG. 17 basically, the normal-equation-generating unit 524 generates a normal equation for each class code supplied from the class-categorizing unit 522 and outputs it to a coefficient-determining unit 525. Therefore, the coefficient-determining unit 525 determines coefficients for each class code and stores the coefficients in the processing-coefficient-setting section 37. Herein, if student images are generated by specifying a motion direction and switching only the motion blur amount, the specific processing coefficients that correspond to the motion blur amount MBp and the class code are stored in the processing-coefficient-setting section 37. Further, if student images are generated by switching the motion blur amounts and the motion directions, processing coefficients that correspond to the motion blur amount MBp, the motion direction corresponding to the motion vector vp, and the class code are stored in the processing-coefficient-setting section 37.

Figure 23:
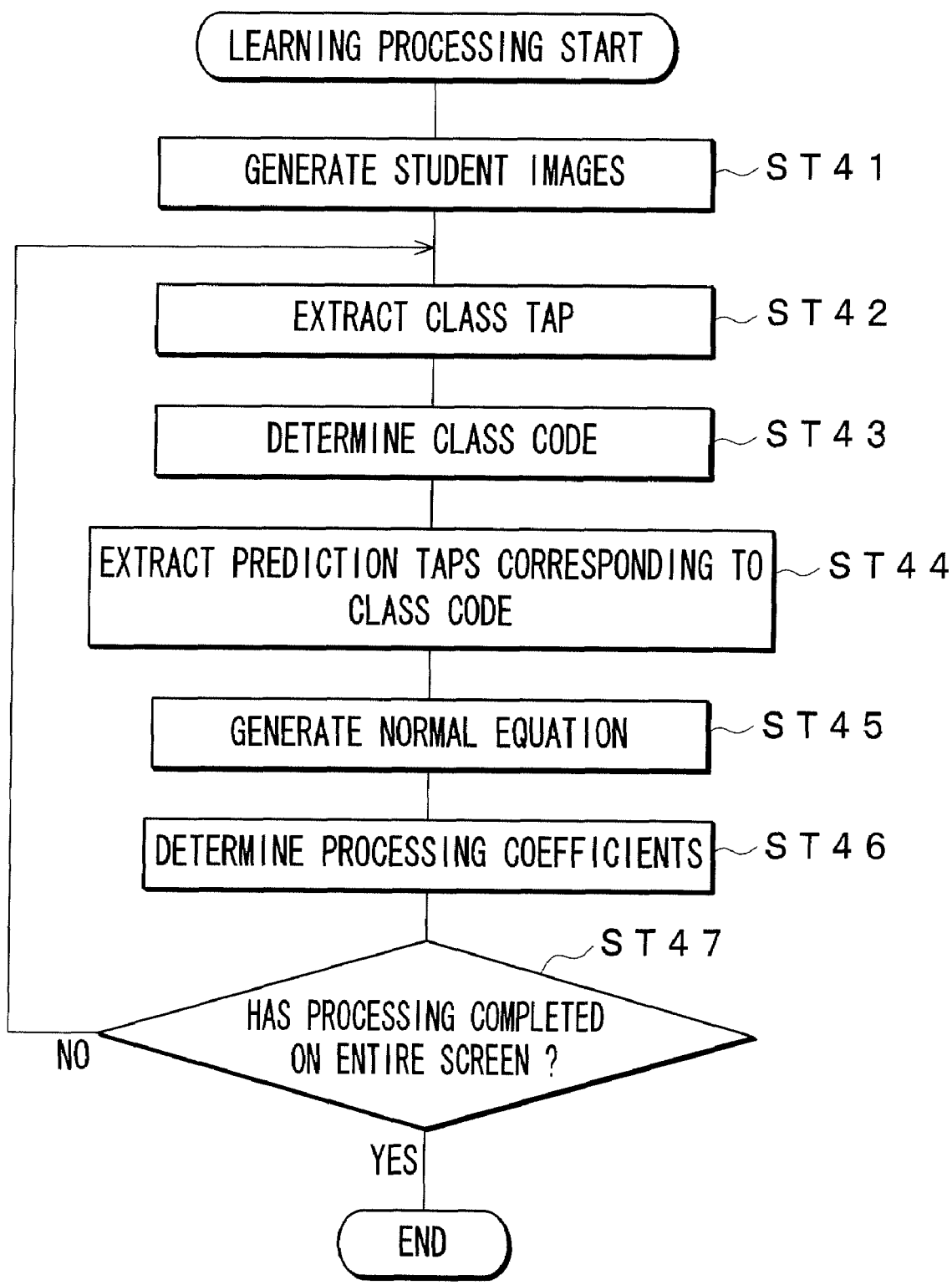
FIG. 23 is a flowchart for showing processing to learn a processing coefficient by use of class categorization.

FIG. 23 is a flowchart for showing the learning processing of processing coefficients by employing class categorization. At step ST41, student images are generated from teacher images. In other words, by adding a motion blur to each of the teacher images, the student images are generated, to each of which a motion blur is added.

At step ST42, a class tap is extracted from each of the student images. The class tap is extracted in the same manner as at the above-described step ST25.

At step ST43, class categorization is performed from the extracted class tap, to determine a class code. At step ST44, prediction taps are extracted from the student images corresponding to the class code determined at the step ST43.

At step ST45, a normal equation is generated from the prediction taps and pixels of the teacher images for each class code.

At step ST46, the normal equation generated at step ST45 is solved to determine processing coefficients and stores them in the processing-coefficient-setting section 37.

At step ST47, it is determined whether the processing is performed on all pixels and, if the processing is not performed yet on any of the pixels, processing starting from step ST42 repeats on new pixels while, if the processing is performed on all pixels, the learning processing ends.

The following describe a case of performing any blur-removing processing in which processing coefficients to be stored in the processing-coefficient-setting section 37 are obtained by using model equations.

Figure 24:
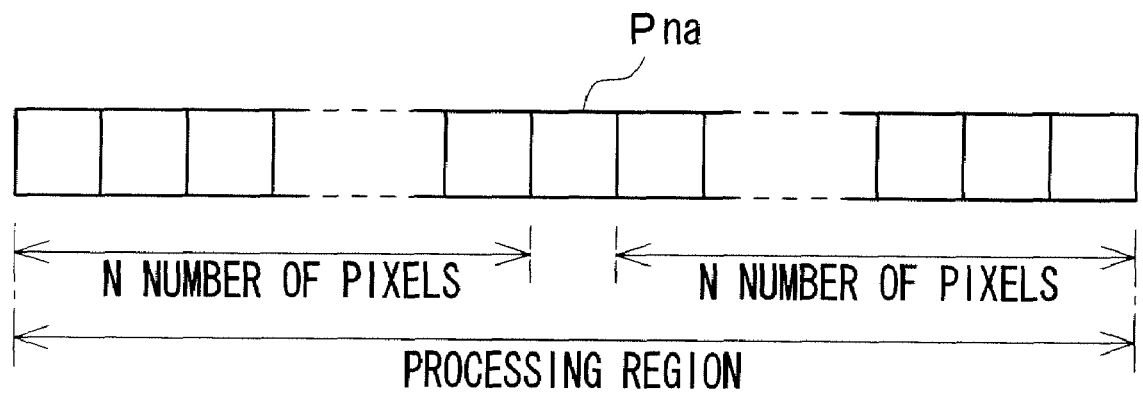
FIG. 24 is a diagram for explaining a processing region.
Figure 25A:
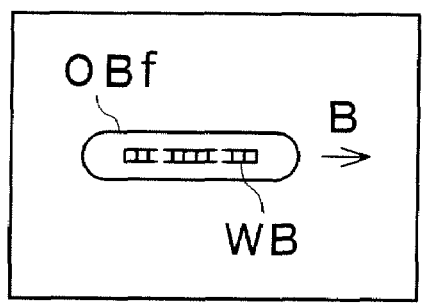
FIGS. 25A and 25B are illustrations each for illustrating an example of setting a processing region.
Figure 25B:
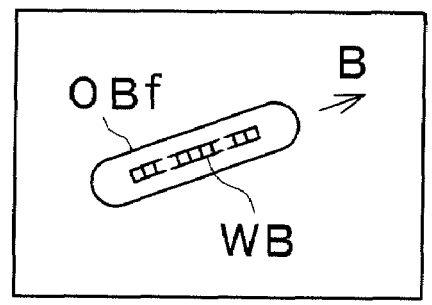

FIG. 24 shows a processing region, in which the processing region is set in a motion direction as much as, for example, (2N+1) number of pixels as a center of a target pixel. FIGS. 25A and 25B show setting examples of processing regions, in which a processing region WB is set horizontally as shown in FIG. 25A when a direction of a motion vector is, for example, horizontal as indicated by an arrow B with respect to a pixel of a moving object OBf whose motion blurs are to be mitigated. When a direction of a motion vector is oblique, as shown in FIG. 25B, a processing region WB is set in a corresponding angle. However, when setting the processing region obliquely, a pixel value that corresponds to a pixel position in the processing region is obtained by interpolation etc., as shown in FIG. 14.

Figure 26:
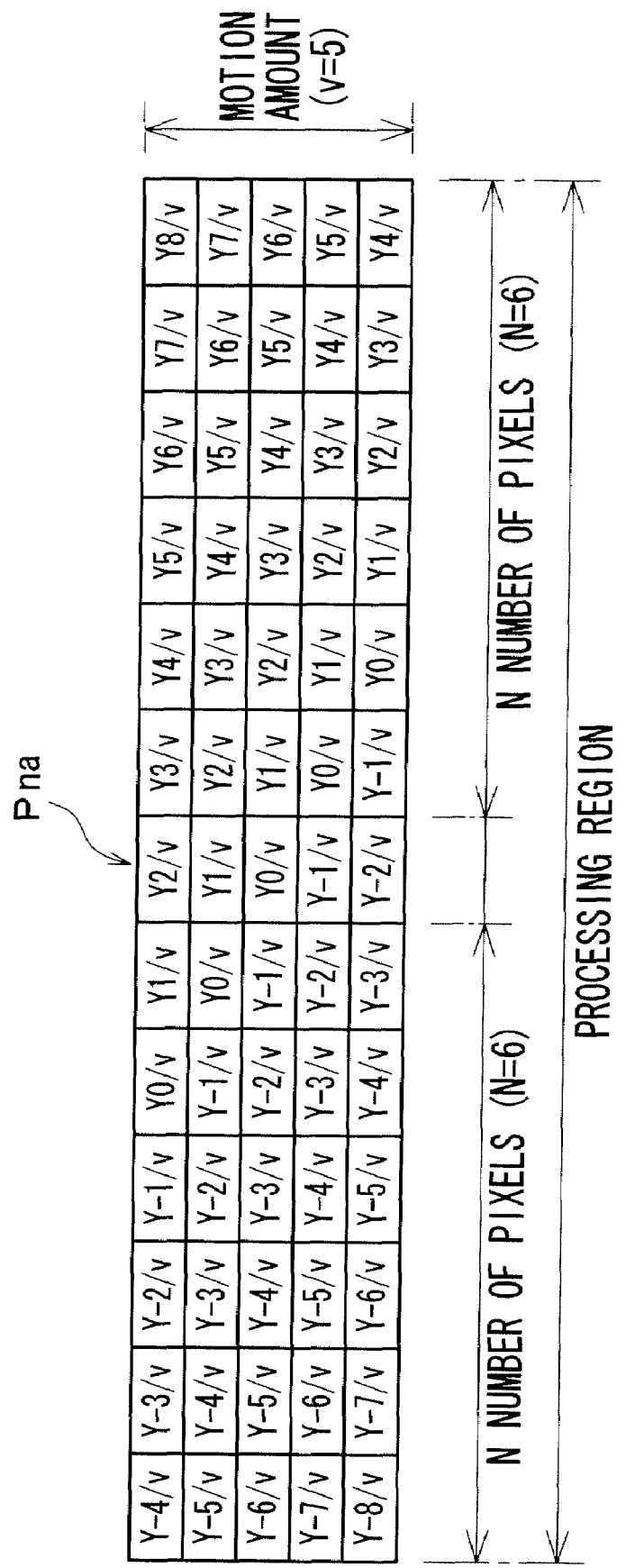
FIG. 26 is an explanatory chart of time-wise mixture of real world variables in a processing region.

Herein, in the processing region, as shown in FIG. 26, real world variables $(Y_{-8}, \ldots, Y_0, \ldots, Y_8)$ are mixed time-wise. It is to be noted that FIG. 26 shows a case where a motion amount v is set to "v=5" and the processing region is made up of 13 pixels (N=6, where N is the number of pixels in a width of processing for the target pixel).

In blur-removing processing, a real world is estimated on the processing region, to output only a central pixel variable $Y_0$ of the estimated real world as a pixel value of a target pixel whose motion blurs have been removed.

If the pixel values of the pixels constituting the processing region are represented by $X_{-N}, X_{-N+1}, \ldots, X_0, \ldots, X_{N-1}, X_N$, (2N+1) number of mixture equations such as ones indicated in Equation 20 are established. It is to be noted that constant h indicates a value of an integral portion of the motion amount v multiplied by ½, that is, a value obtained by discarding its decimal places.

$$\sum_{t+h} (Yi/v) = Xt \quad (20)$$
$$(\text{where } t = -N, \ldots, 0, \ldots, N)$$

However, there are (2N+v) number of real world variables $(Y_{-N-h}, \ldots, Y_0, \ldots, Y_{N+h})$ to be obtained. In other words, the equations are outnumbered by the variables, so that it is impossible to obtain the real world variables $(Y_{-N-h}, \ldots, Y_0, \ldots, Y_{N+h})$ based on the Equation 20.

Therefore, by using Equation 21, which is a constraint equation employing a space correlation, the number of the equations is increased than the real world variables, to obtain values of the real world variables by the least-squares method.

$$Yt - Yt+1 = 0 \text{ (where } t = -N-h, \ldots, 0, \ldots, N+h-1) \quad (21)$$

In other words, by using (4N+v) number of equations including the (2N+1) number of mixture equations represented by the Equation 20 and the (2N+v−1) number of constraint equations represented by the Equation 21, the (2N+v) number of unknown real world variables $(Y_{-N-h}, \ldots, Y_0, \ldots, Y_{N+h})$ are obtained.

Herein, by performing such estimation as to minimize a sum of squares of errors that occur in the equations, it is possible to suppress fluctuations in the pixel values in the real world with performing processing to generate an image in which motion blur is mitigated.

Equation 22 indicates a case where the processing region is set as shown in FIG. 26, in which errors that occur in the respective Equations 20 and 21 are added to them.

$$\begin{bmatrix} 1/v & 1/v & 1/v & 1/v & 1/v & 0 & 0 & 0 & 0 & 0 & 0 & 0 & 0 & 0 & 0 & 0 & 0 \\ 0 & 1/v & 1/v & 1/v & 1/v & 1/v & 0 & 0 & 0 & 0 & 0 & 0 & 0 & 0 & 0 & 0 & 0 \\ 0 & 0 & 1/v & 1/v & 1/v & 1/v & 1/v & 0 & 0 & 0 & 0 & 0 & 0 & 0 & 0 & 0 & 0 \\ 0 & 0 & 0 & 1/v & 1/v & 1/v & 1/v & 1/v & 0 & 0 & 0 & 0 & 0 & 0 & 0 & 0 & 0 \\ 0 & 0 & 0 & 0 & 1/v & 1/v & 1/v & 1/v & 1/v & 0 & 0 & 0 & 0 & 0 & 0 & 0 & 0 \\ 0 & 0 & 0 & 0 & 0 & 1/v & 1/v & 1/v & 1/v & 1/v & 0 & 0 & 0 & 0 & 0 & 0 & 0 \\ 0 & 0 & 0 & 0 & 0 & 0 & 1/v & 1/v & 1/v & 1/v & v & 0 & 0 & 0 & 0 & 0 & 0 \\ 0 & 0 & 0 & 0 & 0 & 0 & 0 & 1/v & 1/v & 1/v & 1/v & 1/v & 0 & 0 & 0 & 0 & 0 \\ 0 & 0 & 0 & 0 & 0 & 0 & 0 & 0 & 1/v & 1/v & 1/v & 1/v & 1/v & 0 & 0 & 0 & 0 \\ 0 & 0 & 0 & 0 & 0 & 0 & 0 & 0 & 0 & 1/v & 1/v & 1/v & 1/v & 1/v & 0 & 0 & 0 \\ 0 & 0 & 0 & 0 & 0 & 0 & 0 & 0 & 0 & 0 & 1/v & 1/v & 1/v & 1/v & 1/v & 0 & 0 \\ 0 & 0 & 0 & 0 & 0 & 0 & 0 & 0 & 0 & 0 & 0 & 1/v & 1/v & 1/v & 1/v & 1/v & 0 \\ 0 & 0 & 0 & 0 & 0 & 0 & 0 & 0 & 0 & 0 & 0 & 0 & 1/v & 1/v & 1/v & 1/v & 1/v \\ 1 & -1 & 0 & 0 & 0 & 0 & 0 & 0 & 0 & 0 & 0 & 0 & 0 & 0 & 0 & 0 & 0 \\ 0 & 1 & -1 & 0 & 0 & 0 & 0 & 0 & 0 & 0 & 0 & 0 & 0 & 0 & 0 & 0 & 0 \\ 0 & 0 & 1 & -1 & 0 & 0 & 0 & 0 & 0 & 0 & 0 & 0 & 0 & 0 & 0 & 0 & 0 \\ 0 & 0 & 0 & 1 & -1 & 0 & 0 & 0 & 0 & 0 & 0 & 0 & 0 & 0 & 0 & 0 & 0 \\ 0 & 0 & 0 & 0 & 1 & -1 & 0 & 0 & 0 & 0 & 0 & 0 & 0 & 0 & 0 & 0 & 0 \\ 0 & 0 & 0 & 0 & 0 & 1 & -1 & 0 & 0 & 0 & 0 & 0 & 0 & 0 & 0 & 0 & 0 \\ 0 & 0 & 0 & 0 & 0 & 0 & 1 & -1 & 0 & 0 & 0 & 0 & 0 & 0 & 0 & 0 & 0 \\ 0 & 0 & 0 & 0 & 0 & 0 & 0 & 1 & -1 & 0 & 0 & 0 & 0 & 0 & 0 & 0 & 0 \\ 0 & 0 & 0 & 0 & 0 & 0 & 0 & 0 & 1 & -1 & 0 & 0 & 0 & 0 & 0 & 0 & 0 \\ 0 & 0 & 0 & 0 & 0 & 0 & 0 & 0 & 0 & 1 & -1 & 0 & 0 & 0 & 0 & 0 & 0 \\ 0 & 0 & 0 & 0 & 0 & 0 & 0 & 0 & 0 & 0 & 1 & -1 & 0 & 0 & 0 & 0 & 0 \\ 0 & 0 & 0 & 0 & 0 & 0 & 0 & 0 & 0 & 0 & 0 & 1 & -1 & 0 & 0 & 0 & 0 \\ 0 & 0 & 0 & 0 & 0 & 0 & 0 & 0 & 0 & 0 & 0 & 0 & 1 & -1 & 0 & 0 & 0 \\ 0 & 0 & 0 & 0 & 0 & 0 & 0 & 0 & 0 & 0 & 0 & 0 & 0 & 1 & -1 & 0 & 0 \\ 0 & 0 & 0 & 0 & 0 & 0 & 0 & 0 & 0 & 0 & 0 & 0 & 0 & 0 & 1 & -1 & 0 \\ 0 & 0 & 0 & 0 & 0 & 0 & 0 & 0 & 0 & 0 & 0 & 0 & 0 & 0 & 0 & 1 & -1 \end{bmatrix} \begin{bmatrix} Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \end{bmatrix} = \begin{bmatrix} X_{-6} \\ X_{-5} \\ X_{-4} \\ X_{-3} \\ X_{-2} \\ X_{-1} \\ X_0 \\ X_1 \\ X_2 \\ X_3 \\ X_4 \\ X_5 \\ X_6 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \\ 0 \end{bmatrix} + \begin{bmatrix} e_{m_{-6}} \\ e_{m_{-5}} \\ e_{m_{-4}} \\ e_{m_{-3}} \\ e_{m_{-2}} \\ e_{m_{-1}} \\ e_{m_0} \\ e_{m_1} \\ e_{m_2} \\ e_{m_3} \\ e_{m_4} \\ e_{m_5} \\ e_{m_6} \\ e_{b_0} \\ e_{b_1} \\ e_{b_2} \\ e_{b_3} \\ e_{b_4} \\ e_{b_5} \\ e_{b_6} \\ e_{b_7} \\ e_{b_8} \\ e_{b_9} \\ e_{b_{10}} \\ e_{b_{11}} \\ e_{b_{12}} \\ e_{b_{13}} \\ e_{b_{14}} \\ e_{b_{15}} \end{bmatrix} \quad (22)$$

This Equation 22 can be expressed as Equation 23 and such $Y(=Y_i)$ as to minimize a sum of squares E of errors indicated in Equation 24 is obtained as Equation 25. It is to be noted that T in the Equation 25 stands for a transposed matrix.

$$AY = X + e \quad (23)$$

$$E = |e|^2 = \Sigma emi^2 + \Sigma ebi^2 \quad (24)$$

$$Y = (A^T A)^{-1} A^T X \quad (25)$$

Herein, a sum of squares of errors is indicated by Equation 26, so that by partially differentiating the sum of squares of the errors in order to provide a partial differential value of 0 as indicated by Equation 27, the Equation 25 that minimizes the sum of squares of the errors can be obtained.

$$E = (AY - X)^T (AY - X) \quad (26)$$
$$= Y^T A^T A Y - 2 Y^T A^T X + X^T X$$

$$\partial E / \partial Y = 2(A^T A Y - A^T X) = 0 \quad (27)$$

By performing linear combination on this Equation 25, the real world variables $(Y_{-N-h}, \ldots, Y_0, \ldots, Y_{N+h})$ can be respectively obtained so that a pixel value of the central pixel variable $Y_0$ can be output as a pixel value of the target pixel. In other words, by obtaining a coefficient for the central pixel variable $Y_0$ for each motion amount, storing them as processing coefficients beforehand in the processing-coefficient-setting section 37, using processing coefficients that correspond to motion amounts stored in the processing-coefficient-setting section 37 to calculate multiply and accumulation of them and pixel values, a motion-blur-removed pixel value is output. By performing such processing on all of the pixels in the processing region, it is possible to obtain motion-blur-mitigated real world variables in the processing region.

Although the above example has obtained the real world variables $(Y_{-N-h}, \ldots, Y_0, \ldots, Y_{N+h})$ by the least-squares method so that a sum of squares E of errors in AY=X+e may be minimized, it is also possible to make the equations in such a manner that the number of the equations may be equal to the number of the variables. By assuming this equation to be AY=X and modifying it into $Y = A^{-1} X$, the real world variables $(Y_{-N-h}, \ldots, Y_0, \ldots, Y_{N+h})$ can be obtained.

Although a case where the foreground object moves in units of pixel has been described in the above-described blur-removing processing by using model equations, if a motion amount of the foreground object is not indicated in units of pixel, an integral extent of the foreground object in a period of exposure time is different from that of a case where the object moves in units of pixel. Thus, if the processing coefficients corresponding to a motion amount that is less than the units of pixel are beforehand obtained, it is possible to perform blur-removing processing accurately by using the processing coefficients corresponding to the motion amount even when the motion amount that is less than the units of pixel are generated.

Figure 27:
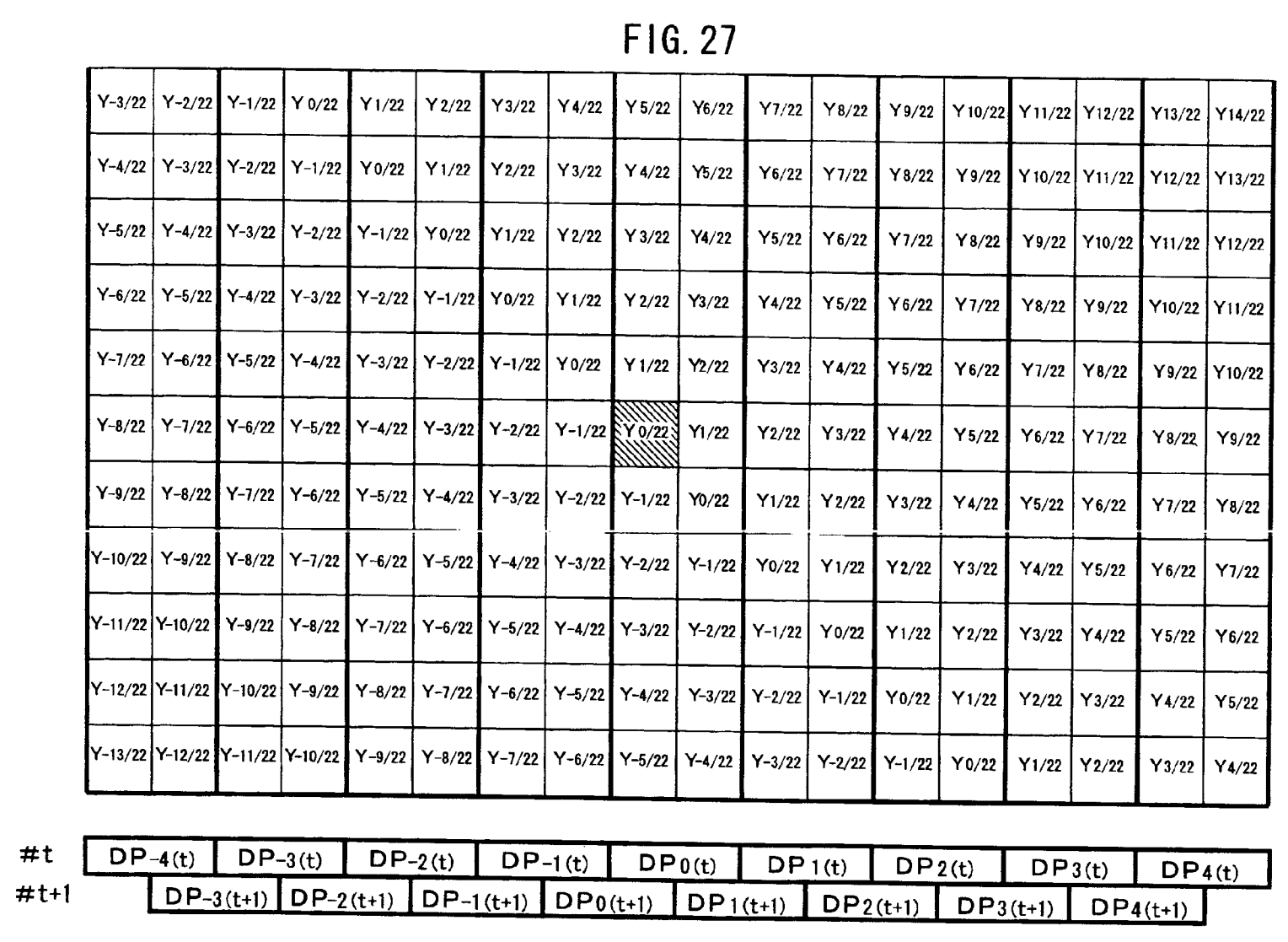

Although, in FIG. 26, an accumulation model in units of pixel in which the real world variables $(Y_{-8}, \ldots, Y_0, \ldots, Y_8)$ are mixed time-wise has been shown, for example, when the motion amount is 5.5 pixels, an accumulation model in units of 0.5 pixels shown in FIG. 27 is set. In this accumulation model, respective divisions of a motion direction and a time direction are increased by, for example, two times in order to correspond to a decimal place of the motion amount. Therefore, although one component has been divided by the motion amount in the accumulation model in units of one pixel, if the respective divisions of the motion direction and the time direction are increased by, for example, two times, a division result thereof is further multiplied by a quarter. In other words, the one component is divided by 22, which is fourfold motion amount. Further, as pixel values of the pixels constituting the processing region, pixel values $DP_{-4(t)}$ through $DP_{4(t)}$ of (t) frame and pixel values $DP_{-3(t+1)}$ through $DP_{4(t+1)}$ of (t+1) frame are employed. Thus, by setting the accumulation models, the above-described Equation 22 can be indicated as Equation 28.

Equation 28

$$\begin{bmatrix}
0.05 & 0.09 & 0.09 & 0.09 & 0.09 & 0.09 & 0.09 & 0.09 & 0.09 & 0.09 & 0.09 & 0.05 & 0.00 & 0.00 & 0.00 \\
0.00 & 0.00 & 0.05 & 0.09 & 0.09 & 0.09 & 0.09 & 0.09 & 0.09 & 0.09 & 0.09 & 0.09 & 0.09 & 0.05 & 0.00 \\
0.00 & 0.00 & 0.00 & 0.00 & 0.05 & 0.09 & 0.09 & 0.09 & 0.09 & 0.09 & 0.09 & 0.09 & 0.09 & 0.09 & 0.09 \\
0.00 & 0.00 & 0.00 & 0.00 & 0.00 & 0.00 & 0.05 & 0.09 & 0.09 & 0.09 & 0.09 & 0.09 & 0.09 & 0.09 & 0.09 \\
0.00 & 0.00 & 0.00 & 0.00 & 0.00 & 0.00 & 0.00 & 0.00 & 0.05 & 0.09 & 0.09 & 0.09 & 0.09 & 0.09 & 0.09 \\
0.00 & 0.00 & 0.00 & 0.00 & 0.00 & 0.00 & 0.00 & 0.00 & 0.00 & 0.00 & 0.05 & 0.09 & 0.09 & 0.09 & 0.09 \\
0.00 & 0.00 & 0.00 & 0.00 & 0.00 & 0.00 & 0.00 & 0.00 & 0.00 & 0.00 & 0.00 & 0.00 & 0.05 & 0.09 & 0.09 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.05 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 0.05 & 0.09 & 0.09 & 0.09 & 0.09 & 0.09 & 0.09 & 0.09 & 0.09 & 0.09 & 0.09 & 0.05 & 0.00 & 0.00 \\
0.00 & 0.00 & 0.00 & 0.05 & 0.09 & 0.09 & 0.09 & 0.09 & 0.09 & 0.09 & 0.09 & 0.09 & 0.09 & 0.09 & 0.05 \\
0.00 & 0.00 & 0.00 & 0.00 & 0.00 & 0.05 & 0.09 & 0.09 & 0.09 & 0.09 & 0.09 & 0.09 & 0.09 & 0.09 & 0.09 \\
0.00 & 0.00 & 0.00 & 0.00 & 0.00 & 0.00 & 0.00 & 0.05 & 0.09 & 0.09 & 0.09 & 0.09 & 0.09 & 0.09 & 0.09 \\
0.00 & 0.00 & 0.00 & 0.00 & 0.00 & 0.00 & 0.00 & 0.00 & 0.00 & 0.05 & 0.09 & 0.09 & 0.09 & 0.09 & 0.09 \\
0.00 & 0.00 & 0.00 & 0.00 & 0.00 & 0.00 & 0.00 & 0.00 & 0.00 & 0.00 & 0.00 & 0.05 & 0.09 & 0.09 & 0.09 \\
0.00 & 0.00 & 0.00 & 0.00 & 0.00 & 0.00 & 0.00 & 0.00 & 0.00 & 0.00 & 0.00 & 0.00 & 0.00 & 0.05 & 0.09 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
\hline
1.00 & -1.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 1.00 & -1.00 & 0.00 & 0.00 & 0.00 & 0.00 & 0.00 & 0.00 & 0.00 & 0.00 & 0.00 & 0.00 & 0.00 & 0.00 \\
0.00 & 0.00 & 1.00 & -1.00 & 0.00 & 0.00 & 0.00 & 0.00 & 0.00 & 0.00 & 0.00 & 0.00 & 0.00 & 0.00 & 0.00 \\
0.00 & 0.00 & 0.00 & 1.00 & -1.00 & 0.00 & 0.00 & 0.00 & 0.00 & 0.00 & 0.00 & 0.00 & 0.00 & 0.00 & 0.00 \\
0.00 & 0.00 & 0.00 & 0.00 & 1.00 & -1.00 & 0.00 & 0.00 & 0.00 & 0.00 & 0.00 & 0.00 & 0.00 & 0.00 & 0.00 \\
0.00 & 0.00 & 0.00 & 0.00 & 0.00 & 1.00 & -1.00 & 0.00 & 0.00 & 0.00 & 0.00 & 0.00 & 0.00 & 0.00 & 0.00 \\
0.00 & 0.00 & 0.00 & 0.00 & 0.00 & 0.00 & 1.00 & -1.00 & 0.00 & 0.00 & 0.00 & 0.00 & 0.00 & 0.00 & 0.00 \\
0.00 & 0.00 & 0.00 & 0.00 & 0.00 & 0.00 & 0.00 & 1.00 & -1.00 & 0.00 & 0.00 & 0.00 & 0.00 & 0.00 & 0.00 \\
0.00 & 0.00 & 0.00 & 0.00 & 0.00 & 0.00 & 0.00 & 0.00 & 1.00 & -1.00 & 0.00 & 0.00 & 0.00 & 0.00 & 0.00 \\
0.00 & 0.00 & 0.00 & 0.00 & 0.00 & 0.00 & 0.00 & 0.00 & 0.00 & 1.00 & -1.00 & 0.00 & 0.00 & 0.00 & 0.00 \\
0.00 & 0.00 & 0.00 & 0.00 & 0.00 & 0.00 & 0.00 & 0.00 & 0.00 & 0.00 & 1.00 & -1.00 & 0.00 & 0.00 & 0.00 \\
0.00 & 0.00 & 0.00 & 0.00 & 0.00 & 0.00 & 0.00 & 0.00 & 0.00 & 0.00 & 0.00 & 1.00 & -1.00 & 0.00 & 0.00 \\
0.00 & 0.00 & 0.00 & 0.00 & 0.00 & 0.00 & 0.00 & 0.00 & 0.00 & 0.00 & 0.00 & 0.00 & 1.00 & -1.00 & 0.00 \\
0.00 & 0.00 & 0.00 & 0.00 & 0.00 & 0.00 & 0.00 & 0.00 & 0.00 & 0.00 & 0.00 & 0.00 & 0.00 & 1.00 & -1.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 1.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
0.00 & 0.00 & 0.00 & 0.00 & 0.00 & 0.00 & 0.00 & 0.00 & 0.00 & 0.00 & 0.00 & 0.00 & 0.00 & 0.00 & 0.00 \\
\end{bmatrix} \quad (28)$$

-continued

| | | | | | | | | | | | | |
|---|---|---|---|---|---|---|---|---|---|---|---|---|
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.05 | 0.00 | 0.00 | 0.00 | 0.00 | 0.00 | 0.00 | 0.00 | 0.00 | 0.00 | 0.00 | 0.00 | 0.00 |
| 0.09 | 0.09 | 0.05 | 0.00 | 0.00 | 0.00 | 0.00 | 0.00 | 0.00 | 0.00 | 0.00 | 0.00 | 0.00 |
| 0.09 | 0.09 | 0.09 | 0.09 | 0.05 | 0.00 | 0.00 | 0.00 | 0.00 | 0.00 | 0.00 | 0.00 | 0.00 |
| 0.09 | 0.09 | 0.09 | 0.09 | 0.09 | 0.09 | 0.05 | 0.00 | 0.00 | 0.00 | 0.00 | 0.00 | 0.00 |
| 0.09 | 0.09 | 0.09 | 0.09 | 0.09 | 0.09 | 0.09 | 0.09 | 0.05 | 0.05 | 0.00 | 0.00 | 0.00 |
| 0.09 | 0.09 | 0.09 | 0.09 | 0.09 | 0.09 | 0.09 | 0.09 | 0.09 | 0.09 | 0.05 | 0.00 | 0.00 |
| 0.00 | 0.05 | 0.09 | 0.09 | 0.09 | 0.09 | 0.09 | 0.09 | 0.09 | 0.09 | 0.09 | 0.09 | 0.05 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.09 | 0.05 | 0.00 | 0.00 | 0.00 | 0.00 | 0.00 | 0.00 | 0.00 | 0.00 | 0.00 | 0.00 | 0.00 |
| 0.09 | 0.09 | 0.09 | 0.05 | 0.00 | 0.00 | 0.00 | 0.00 | 0.00 | 0.00 | 0.00 | 0.00 | 0.00 |
| 0.09 | 0.09 | 0.09 | 0.09 | 0.09 | 0.05 | 0.00 | 0.00 | 0.00 | 0.00 | 0.00 | 0.00 | 0.00 |
| 0.09 | 0.09 | 0.09 | 0.09 | 0.09 | 0.09 | 0.09 | 0.05 | 0.00 | 0.00 | 0.00 | 0.00 | 0.00 |
| 0.09 | 0.09 | 0.09 | 0.09 | 0.09 | 0.09 | 0.09 | 0.09 | 0.09 | 0.09 | 0.00 | 0.00 | 0.00 |
| 0.05 | 0.09 | 0.09 | 0.09 | 0.09 | 0.09 | 0.09 | 0.09 | 0.09 | 0.09 | 0.09 | 0.05 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| 0.00 | 0.00 | 0.00 | 0.00 | 0.00 | 0.00 | 0.00 | 0.00 | 0.00 | 0.00 | 0.00 | 0.00 | 0.00 |
| −1.00 | 0.00 | 0.00 | 0.00 | 0.00 | 0.00 | 0.00 | 0.00 | 0.00 | 0.00 | 0.00 | 0.00 | 0.00 |
| 1.00 | −1.00 | 0.00 | 0.00 | 0.00 | 0.00 | 0.00 | 0.00 | 0.00 | 0.00 | 0.00 | 0.00 | 0.00 |
| 0.00 | 1.00 | −1.00 | 0.00 | 0.00 | 0.00 | 0.00 | 0.00 | 0.00 | 0.00 | 0.00 | 0.00 | 0.00 |
| 0.00 | 0.00 | 1.00 | −1.00 | 0.00 | 0.00 | 0.00 | 0.00 | 0.00 | 0.00 | 0.00 | 0.00 | 0.00 |
| 0.00 | 0.00 | 0.00 | 1.00 | −1.00 | 0.00 | 0.00 | 0.00 | 0.00 | 0.00 | 0.00 | 0.00 | 0.00 |
| 0.00 | 0.00 | 0.00 | 0.00 | 1.00 | −1.00 | 0.00 | 0.00 | 0.00 | 0.00 | 0.00 | 0.00 | 0.00 |
| 0.00 | 0.00 | 0.00 | 0.00 | 0.00 | 1.00 | −1.00 | 0.00 | 0.00 | 0.00 | 0.00 | 0.00 | 0.00 |
| 0.00 | 0.00 | 0.00 | 0.00 | 0.00 | 0.00 | 1.00 | −1.00 | 0.00 | 0.00 | 0.00 | 0.00 | 0.00 |
| 0.00 | 0.00 | 0.00 | 0.00 | 0.00 | 0.00 | 0.00 | 1.00 | −1.00 | 0.00 | 0.0. | 0.00 | 0.00 |
| 0.00 | 0.00 | 0.00 | 0.00 | 0.00 | 0.00 | 0.00 | 0.00 | 1.00 | −1.00 | 0.00 | 0.00 | 0.00 |
| 0.00 | 0.00 | 0.00 | 0.00 | 0.00 | 0.00 | 0.00 | 0.00 | 0.00 | 1.00 | −1.00 | 0.00 | 0.00 |
| 0.00 | 0.00 | 0.00 | 0.00 | 0.00 | 0.00 | 0.00 | 0.00 | 0.00 | 0.00 | 1.00 | −1.00 | 0.00 |
| 0.00 | 0.00 | 0.00 | 0.00 | 0.00 | 0.00 | 0.00 | 0.00 | 0.00 | 0.00 | 0.00 | 1.00 | −1.00 |

-continued $$\begin{bmatrix} Y_{-13} \\ Y_{-12} \\ Y_{-11} \\ Y_{-10} \\ Y_{-9} \\ Y_{-8} \\ Y_{-7} \\ Y_{-6} \\ Y_{-5} \\ Y_{-4} \\ Y_{-3} \\ Y_{-2} \\ Y_{-1} \\ Y_0 \\ Y_1 \\ Y_2 \\ Y_3 \\ Y_4 \\ Y_5 \\ Y_6 \\ Y_7 \\ Y_8 \\ Y_9 \\ Y_{10} \\ Y_{11} \\ Y_{12} \\ Y_{13} \\ Y_{14} \end{bmatrix} = \begin{bmatrix} DQ_{-4t0} \\ DQ_{-3t0} \\ DQ_{-2t0} \\ DQ_{-1t0} \\ DQ_{0t0} \\ DQ_{1t0} \\ DQ_{2t0} \\ DQ_{3t0} \\ DQ_{4t0} \\ DQ_{-3t1} \\ DQ_{-2t1} \\ DQ_{-1t1} \\ DQ_{0t1} \\ DQ_{1t1} \\ DQ_{2t1} \\ DQ_{2t1} \\ DQ_{4t1} \\ \hline 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \\ 0.00 \end{bmatrix} + \begin{bmatrix} e_{m_{-4t0}} \\ e_{m_{-3t0}} \\ e_{m_{-2t0}} \\ e_{m_{-1t0}} \\ e_{m_{0t0}} \\ e_{m_{1t0}} \\ e_{m_{2t0}} \\ e_{m_{3t0}} \\ e_{m_{4t0}} \\ e_{m_{-3t1}} \\ e_{m_{-2t1}} \\ e_{m_{-1t1}} \\ e_{m_{0t1}} \\ e_{m_{1t1}} \\ e_{m_{2t1}} \\ e_{m_{3t1}} \\ e_{m_{4t1}} \\ \hline e_{b_{-13}} \\ e_{b_{-12}} \\ e_{b_{-11}} \\ e_{b_{-10}} \\ e_{b_{-9}} \\ e_{b_{-8}} \\ e_{b_{-7}} \\ e_{b_{-6}} \\ e_{b_{-5}} \\ e_{b_{-4}} \\ e_{b_{-3}} \\ e_{b_{-2}} \\ e_{b_{-1}} \\ e_{b_0} \\ e_{b_1} \\ e_{b_2} \\ e_{b_3} \\ e_{b_4} \\ e_{b_5} \\ e_{b_6} \\ e_{b_7} \\ e_{b_8} \\ e_{b_9} \\ e_{b_{10}} \\ e_{b_{11}} \\ e_{b_{12}} \\ e_{b_{13}} \end{bmatrix}$$

Figure 28:
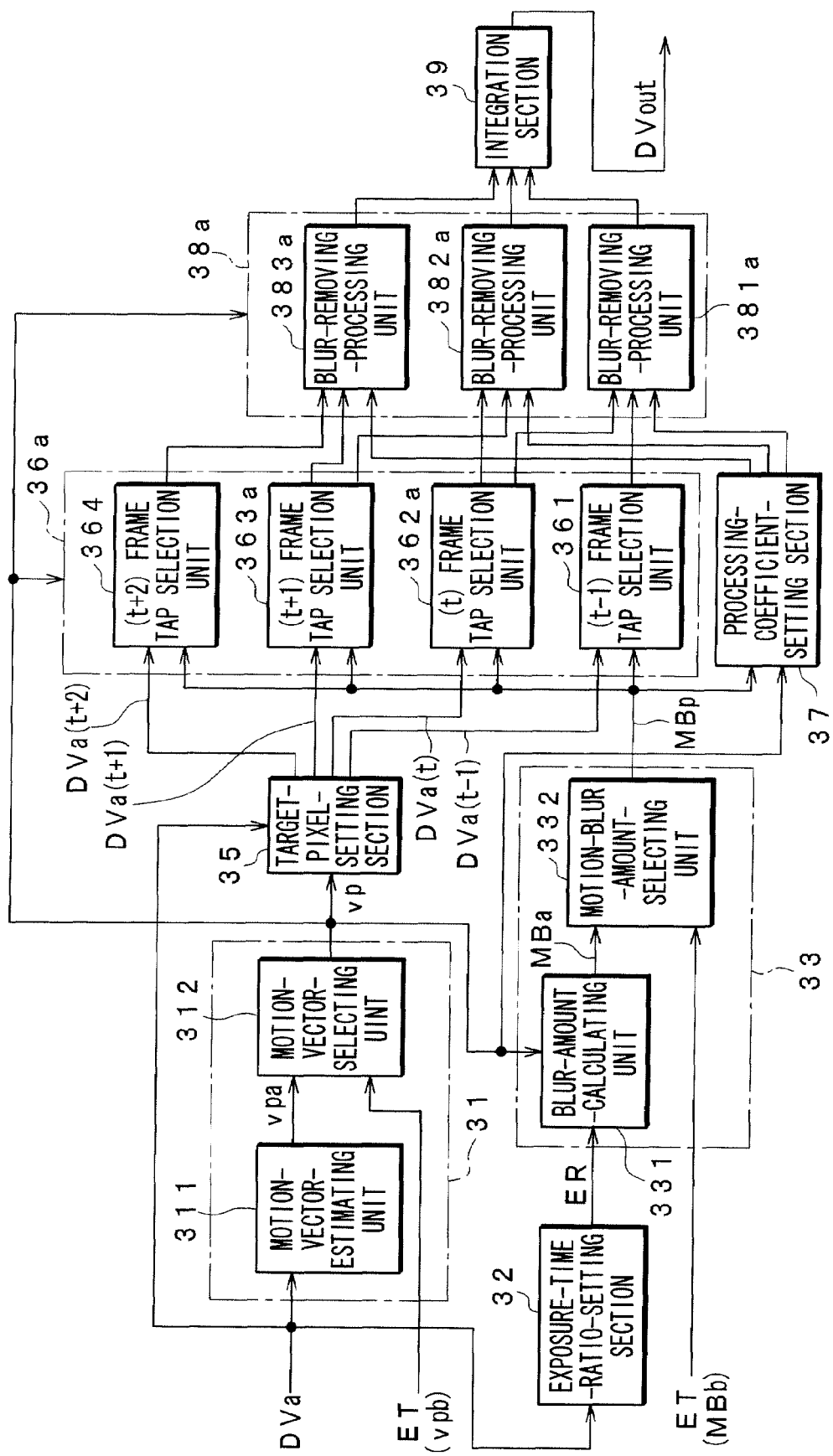
FIG. 28 is another functional block diagram of the image-processing apparatus.

FIG. 28 is a functional block diagram of the image-processing apparatus in a case where the accumulation model shown in FIG. 27 is used. It is to be noted that components of FIG. 28 that correspond to those of FIG. 6 are indicated by the same symbols, detailed description of which will be omitted.

A (t) frame tap selection unit 362a extracts pixel values in the processing region and supplies them to blur-removing-processing units 381a, 382a so that the blur-removing-processing unit 381a performs calculation processing by using the pixel values supplied from a (t−1) frame tap selection unit 361 and the (t) frame tap selection unit 362a and the processing coefficients supplied from the processing-coefficient-setting section 37 to generate a pixel value of the motion-blur-removed target pixel. In other words, by multiplying the processing coefficients of Y0 in the Equation 28 with the pixel values supplied from the (t−1) frame tap selection unit 361 and the (t) frame tap selection unit 362a to perform calculation, it is possible to obtain a motion-blur-removed pixel value of the target pixel when the motion amount is not in units of pixel. Further, a (t+1) frame tap selection unit 363a extracts pixel values in the processing region and supplies them to the blur-removing-processing units 382a, 383a so that if the pixel values in the processing region are supplied from a (t+2) frame tap selection unit 364 to the blur-removing-processing unit 383a, the blur-removing-processing units 382a, 383a can also perform the same processing as that of the blur-removing-processing unit 381a, thereby enabling the further processing accuracy to be improved by performing any integration processing on the pixel values of the target pixels obtained in the blur-removing-processing units.

Thus, when obtaining values of the real world variables, the values of the real world variables can be obtained by using a plurality of pixel values, so that an excellently accurate blur-removing processing can be executed. Further, calculating beforehand such the processing coefficients thus obtained allows the values of real world variables, namely, the pixel values of the blur-removed target pixels to be easily obtained by reading the processing coefficients corresponding to the motion amount even if the motion amount is not in units of pixel.

Figure 29:
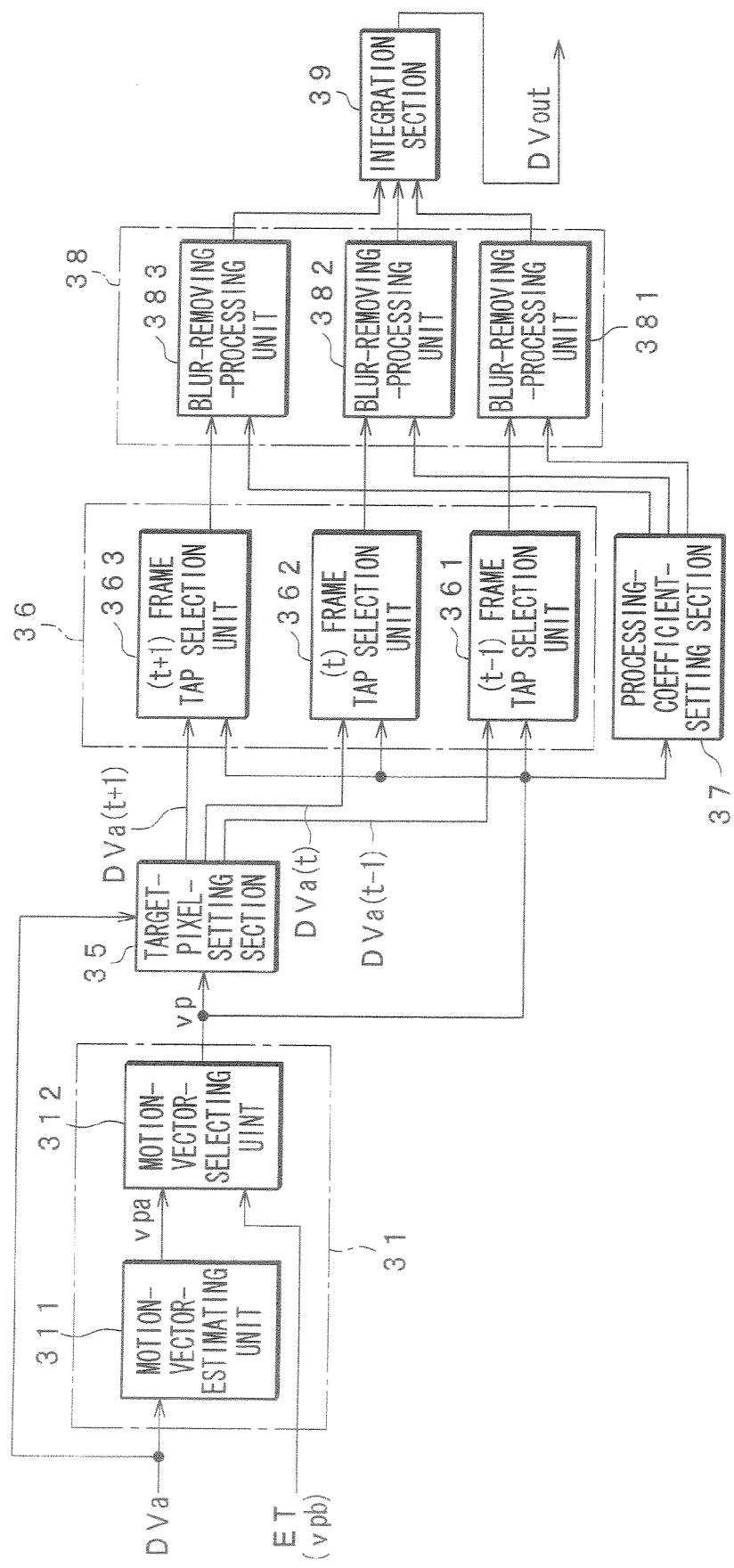
FIG. 29 is a functional block diagram of an image-processing apparatus when a shutter operation is limited.

Next, if no shutter operation is executed, the exposure time ratio becomes one so that the motion amount of the target pixel is equal to that of the motion vector set in the motion-vector-setting section 31. Therefore, if no shutter operation is defined, as shown in FIG. 29, the image-processing apparatus can be configured without providing any exposure-time-ratio-setting section. It is to be noted that components of FIG. 29 that correspond to those of FIG. 6 are indicated by the same symbols, detailed description of which will be omitted.

In this case, the motion vector vp set in the motion-vector-setting section 31 is supplied to the target-pixel-setting section 35, the processing-region-setting section 36, and the processing-coefficient-setting section 37, so that if the processing regions and the processing coefficients are set corresponding to the motion blur amount and the motion direction based on this motion vector vp, it is possible to perform the motion blur removing similar to those of the above-described embodiments.

Further, if any reference is made to the specific processing coefficients supplied from the processing-coefficient-setting section 37 to each of the blur-removing-processing units 381, 382, 383 based on the motion blur amount MBp or made to the processing coefficients supplied respectively corresponding to the motion blur amount and the motion direction of the target pixel, it is possible to generate the pixel value of the target pixel by performing multiply and accumulation calculation processing by using the processing coefficients and the pixel values in the processing regions without generating any processing coefficients in each of the blur-removing-processing units 381, 382, 383, respectively, to integrate them in the integration section 39.

Figure 30:
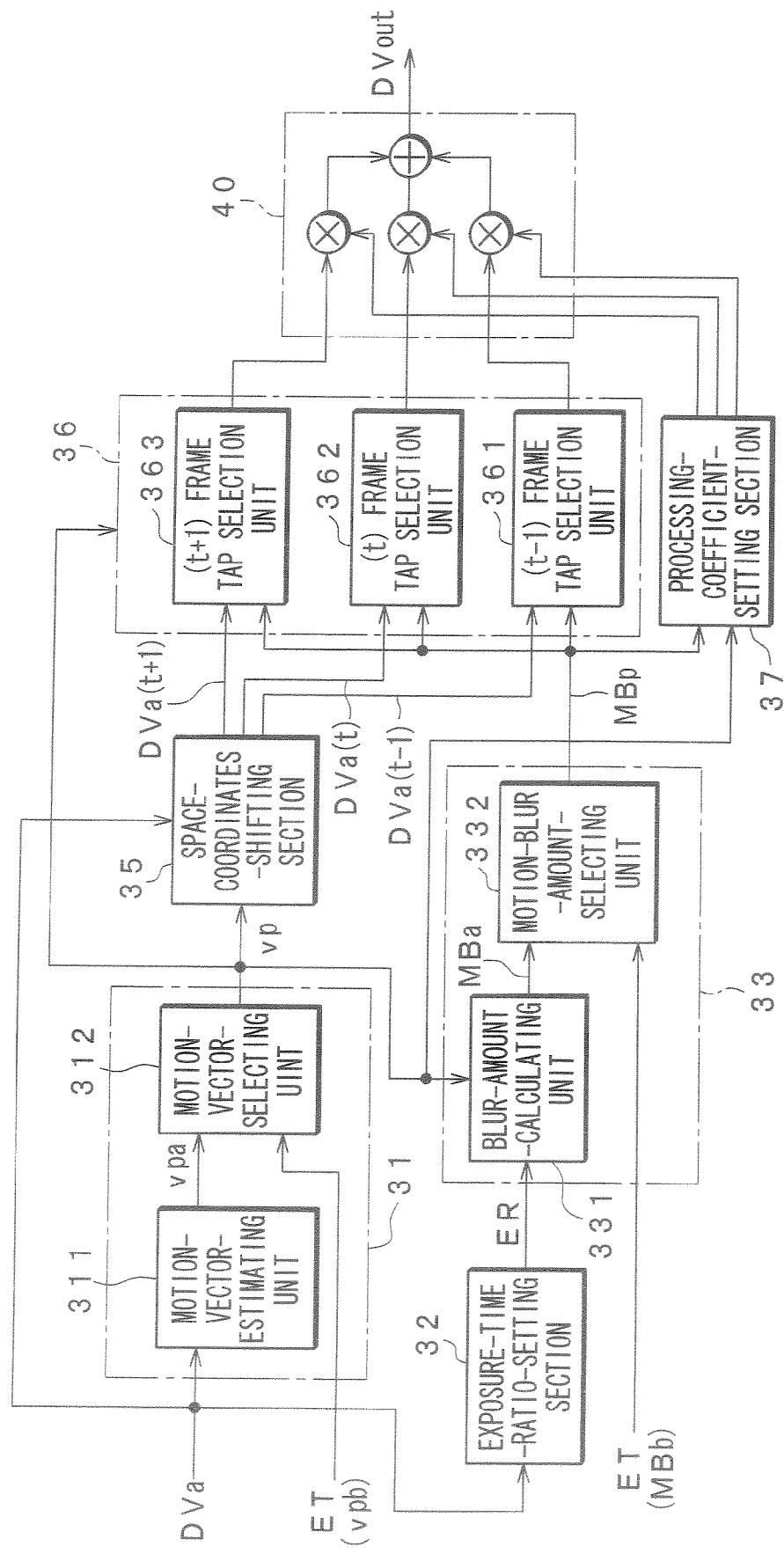
FIG. 30 is a functional block diagram of an image-processing apparatus when performing multiply and accumulation calculation.

FIG. 30 is a functional block diagram of an image-processing apparatus in a case where a multiply and accumulation calculation processing is performed by using the processing coefficients and the pixel values of taps. It is to be noted that components of FIG. 30 that correspond to those of FIG. 6 are indicated by the same symbols, detailed description of which will be omitted.

In this case, the processing-coefficient-setting section 37 selects the processing coefficients corresponding to the motion blur amount MBp and the motion direction corresponding to the motion vector vp from the stored processing coefficients that are referenced to each other and supplies them to a multiply-and-accumulation-calculation-processing section 40. In the multiply-and-accumulation-calculation-processing section 40, the motion-blur-removed pixel value of the target pixel is generated and output by performing the multiply and accumulation calculation of the pixel values in the processing regions set in the processing-region-setting section 36 along the motion direction corresponding to the motion vector vp and the processing coefficients. For example, if weighting performed in the above-described integration section 39 is executed on the processing coefficients stored in the processing-coefficient-setting section 37 beforehand, the pixel value output from the multiply-and-accumulation-calculation-processing section 40 can be obtained similar to those in a case where weighting is executed by using the motion-blur-removed image signal of the plural frames as described above. Further, if images to be processed are as much as N frames and the multiply and accumulation calculation is performed, setting the processing coefficients for each of the images to be processed so as to be multiplied with 1/N beforehand allows a dynamic range of the multiply-and-accumulation-calculated pixel values to be prevented from varying.

INDUSTRIAL APPLICABILITY

As described above, an image-processing apparatus, an image-processing method, and an image-processing program according to the present invention may be useful in extracting information embedded into an image signal that can be obtained by picking-up a real society with an image sensor and be suitable for obtaining a high-resolution image from which any motion blurs are removed.

The invention claimed is:
1. An image-processing apparatus comprising:
a motion-vector-setting section that sets a motion vector in units of pixel in a target image;
a target-pixel-setting section that sets a target pixel for each image in plural images to be processed based on the motion vector set in the motion-vector-setting section;
an exposure-time-ratio-setting section that sets an exposure time ratio that is a ratio between a time interval of the target image and a period of exposure time, wherein the period of exposure time is greater than zero;
a motion-blur-amount-setting section that sets a motion blur amount in units of pixel based on the motion vector set in units of pixel in the motion-vector-setting section and the exposure time ratio set in the exposure-time-ratio-setting section;
a processing-region-setting section that sets a processing region corresponding to the target pixel set for each image in the target-pixel-setting section based on the motion blur amount set in the motion-blur-amount-setting section and a motion direction corresponding to the motion vector;
a processing-coefficient-setting section that sets a specific processing coefficient based on the motion blur amount of the target pixel set in the motion-blur-amount-setting section or sets a processing coefficient that corresponds to the motion blur amount and the motion direction of the target pixel; and a pixel-value-generating section that generates a pixel value that corresponds to the target pixel by linear combination of a new pixel value for processing generated corresponding to the motion direction from the pixel value corresponding to the pixel in the processing region set for each image and the specific processing coefficient set in the processing-coefficient-setting section or by linear combination of the pixel value corresponding to the pixel in the processing region and the processing coefficient set corresponding to the motion blur amount and the motion direction of the target pixel.

2. The image-processing apparatus according to claim 1, wherein the processing-coefficient-setting section sets the processing coefficient for each image based on the motion blur amount corresponding to the target pixel of each of the images set from the motion blur amount.

3. The image-processing apparatus according to claim 2, comprising an integration section that integrates the pixel value corresponding to the target pixel for each image, which are generated in the pixel-value-generating section, and outputs a single pixel value.

4. The image-processing apparatus according to claim 1, wherein when the target image is an image picked-up without using a shutter, the motion-blur-amount-setting section sets a motion amount corresponding to the motion vector as the motion blur amount.

5. The image-processing apparatus according to claim 1, wherein the motion-vector-setting section sets the motion amount of the motion vector in units of sub-pixel.

6. An image-processing method comprising:

a motion-vector-setting step of setting, by a processor of an image-processing apparatus, a motion vector in units of pixel in a target image;

a target-pixel-setting step of setting, by the processor, a target pixel for each image in plural images to be processed based on the motion vector set in the motion-vector-setting step;

an exposure-time-ratio-setting step of setting, by the processor, an exposure time ratio that is a ratio between a time interval of the target image and a period of exposure time, wherein the period of exposure time is greater than zero;

a motion-blur-amount-setting step of setting, by the processor, a motion blur amount in units of pixel based on the motion vector set in units of pixel in the motion-vector-setting step and the exposure time ratio set in the exposure-time-ratio-setting step;

a processing-region-setting step of setting, by the processor, a processing region corresponding to the target pixel set for each image in the target-pixel-setting step based on the motion blur amount set in the motion-blur-amount-setting step and a motion direction corresponding to the motion vector;

a processing-coefficient-setting step of setting, by the processor, a specific processing coefficient based on the motion blur amount of the target pixel set in the motion-blur-amount-setting step or setting a processing coefficient that corresponds to the motion blur amount and the motion direction of the target pixel; and a pixel-value-generating step of generating, by the processor, a pixel value that corresponds to the target pixel by linear combination of a new pixel value for processing generated corresponding to the motion direction from the pixel value corresponding to the pixel in the processing region set for each image and the specific processing coefficient set in the processing-coefficient-setting step or by linear combination of the pixel value corresponding to the pixel in the processing region and the processing coefficient set corresponding to the motion blur amount and the motion direction of the target pixel.

7. A non-transitory computer readable medium including computer program instructions, which when executed by an image-processing apparatus, causes the image-processing apparatus to perform:

a motion-vector-setting step of setting a motion vector in units of pixel in a target image;

a target-pixel-setting step of setting a target pixel for each image in plural images to be processed based on the motion vector set in the motion-vector-setting step;

an exposure-time-ratio-setting step of setting an exposure time ratio that is a ratio between a time interval of the target image and a period of exposure time, wherein the period of exposure time is greater than zero;

a motion-blur-amount-setting step of setting a motion blur amount in units of pixel based on the motion vector set in units of pixel in the motion-vector-setting step and the exposure time ratio set in the exposure-time-ratio-setting step;

a processing-region-setting step of setting a processing region corresponding to the target pixel set for each image in the target-pixel-setting step based on the motion blur amount set in the motion-blur-amount-setting step and a motion direction corresponding to the motion vector;

a processing-coefficient-setting step of setting a specific processing coefficient based on the motion blur amount of the target pixel set in the motion-blur-amount-setting step or setting a processing coefficient that corresponds to the motion blur amount and the motion direction of the target pixel; and a pixel-value-generating step of generating a pixel value that corresponds to the target pixel by linear combination of a new pixel value for processing generated corresponding to the motion direction from the pixel value corresponding to the pixel in the processing region set for each image and the specific processing coefficient set in the processing-coefficient-setting step or by linear combination of the pixel value corresponding to the pixel in the processing region and the processing coefficient set corresponding to the motion blur amount and the motion direction of the target pixel.

* * * * *